(12) United States Patent
Steeber

(10) Patent No.: US 9,415,947 B2
(45) Date of Patent: Aug. 16, 2016

(54) CONVEYOR ACCUMULATOR FOR CONTROLLING THE FLOW OF ARTICLES BEING CONVEYED

(71) Applicant: Barry-Wehmiller Container Systems, Inc., St. Louis, MO (US)

(72) Inventor: Dorian F. Steeber, Fort Gibson, OK (US)

(73) Assignee: Barry-Wehmiller Container Systems, Inc., St. Louis, MO (US)

( * ) Notice: Subject to any disclaimer, the term of this patent is extended or adjusted under 35 U.S.C. 154(b) by 0 days.

(21) Appl. No.: 14/933,726

(22) Filed: Nov. 5, 2015

(65) Prior Publication Data

US 2016/0052726 A1 Feb. 25, 2016

Related U.S. Application Data

(60) Division of application No. 13/376,789, filed as application No. PCT/US2011/063577 on Dec. 6, 2011, now Pat. No. 9,212,008, which is a continuation of application No. 12/961,176, filed on Dec. 6, 2010, now abandoned.

(51) Int. Cl.
*B65G 1/02* (2006.01)
*B65G 47/26* (2006.01)
(Continued)

(52) U.S. Cl.
CPC ................ *B65G 47/261* (2013.01); *B65G 1/00* (2013.01); *B65G 47/5127* (2013.01)

(58) Field of Classification Search
CPC ............. B65G 47/261; B65G 47/5109; B65G 47/5113; B65G 1/02
USPC ...................................................... 198/347.4
See application file for complete search history.

(56) References Cited

U.S. PATENT DOCUMENTS 2,932,376 A 4/1960 Millington
3,053,378 A 9/1962 Longenecker
(Continued)

FOREIGN PATENT DOCUMENTS

DE 10312695 A1 10/2004
EP 0390241 A2 10/1990
(Continued)

OTHER PUBLICATIONS

Meurer Horizontal and Vertical Buffers at p. 2, http://www.meurer-gruppe.de/fileadmin/pdf/technische_infos/meurer_CM_HSP_VSP_d_engl.pdf.
(Continued)

*Primary Examiner* — James R Bidwell
(74) *Attorney, Agent, or Firm* — Thompson Coburn LLP; Clyde L. Smith

(57) ABSTRACT

A buffer assembly is configured to buffer a stream of articles moving along a conveyor. The buffer assembly is interposed in said conveyor. The buffer assembly has a horizontal in-feed accumulator that is configured to receive the stream of articles from said conveyor, and a horizontal mass storage accumulator connected to an output of the horizontal in-feed accumulator for receiving said stream of articles therefrom. Each of the horizontal in-feed accumulator and the horizontal mass storage accumulator are configured to buffer said stream of articles. The buffer assembly also has a horizontal out-feed accumulator connected to the output of the horizontal mass storage accumulator that is configured to buffer the stream of articles. The in-feed buffering of the articles prevents product compression and the buffering of the out-feed articles prevents the formation of gaps between product articles.

4 Claims, 20 Drawing Sheets

(51) Int. Cl.
 *B65G 1/00* (2006.01)
 *B65G 47/51* (2006.01)

(56) References Cited

U.S. PATENT DOCUMENTS

| | | | |
|---|---|---|---|
| 3,173,557 A | | 3/1965 | Gunnar |
| 3,506,110 A | * | 4/1970 | Paul ................... B65G 47/5109 198/347.4 |
| 4,142,345 A | | 3/1979 | Porter, Jr. |
| 4,401,207 A | * | 8/1983 | Garvey ................ B65G 47/684 198/347.4 |
| 4,413,724 A | | 11/1983 | Fellner |
| 4,513,858 A | * | 4/1985 | Fellner ............... B65G 47/5122 198/812 |
| 5,007,521 A | | 4/1991 | Tanaka |
| 5,308,001 A | * | 5/1994 | Grecksch ............... D01H 9/187 198/347.4 |
| 5,411,131 A | * | 5/1995 | Haegele ................ B65G 43/08 198/347.4 |
| 6,450,751 B1 | | 9/2002 | Hollander |
| 6,464,065 B2 | * | 10/2002 | Herubel ............... B65G 47/682 198/347.4 |
| 6,497,321 B2 | | 12/2002 | Horton et al. |
| 6,591,963 B2 | | 7/2003 | Wipf |
| 6,681,915 B2 | | 1/2004 | Pattantyus-Abraham et al. |
| 6,725,998 B2 | | 4/2004 | Steeber et al. |
| 8,092,140 B2 | | 1/2012 | Baker et al. |
| 8,770,377 B2 | * | 7/2014 | Seger ....................... B65G 1/00 198/347.1 |
| 8,877,128 B2 | | 11/2014 | Fukugaki et al. |
| 2008/0257685 A1 | | 10/2008 | Huttner et al. |

FOREIGN PATENT DOCUMENTS

| | | |
|---|---|---|
| FR | 2810653 A1 | 12/2001 |
| JP | S58-31803 B2 | 7/1983 |
| JP | H07267352 A | 10/1995 |
| JP | 2004-010341 A | 1/2004 |
| JP | 2008-050155 A | 3/2008 |
| JP | 4601590 B2 | 12/2010 |
| WO | 2008026478 A1 | 3/2008 |

OTHER PUBLICATIONS

Meurer, Our Buffer Systems, http://www.meurer-gruppe.de/index.php?id=61&L=1.
Non-Certified English Translation of JP4601590 B2.
Non-Certified Partial Japanese to English Computer Conversion of JP 58-31803—contains Claims, Detailed Description and Description of the Drawings.
Third Party observations filed in corresponding European Patent Application No. 11847772.8 dated Oct. 17, 2014.

* cited by examiner

FOOTPRINT COMPARISON

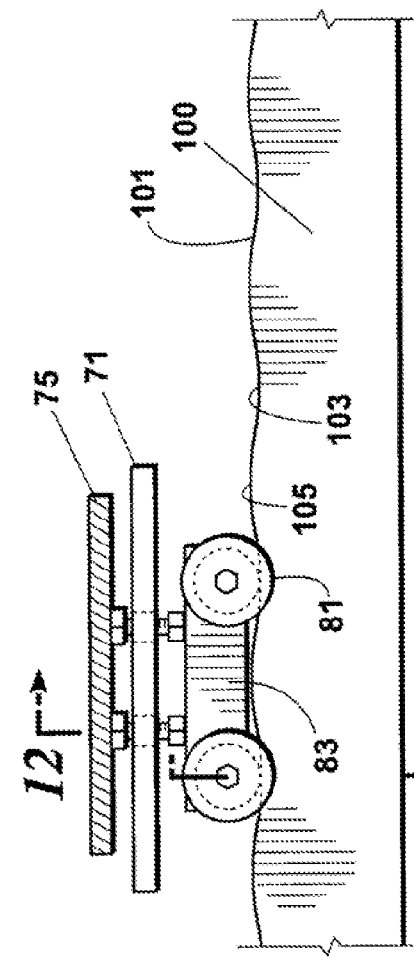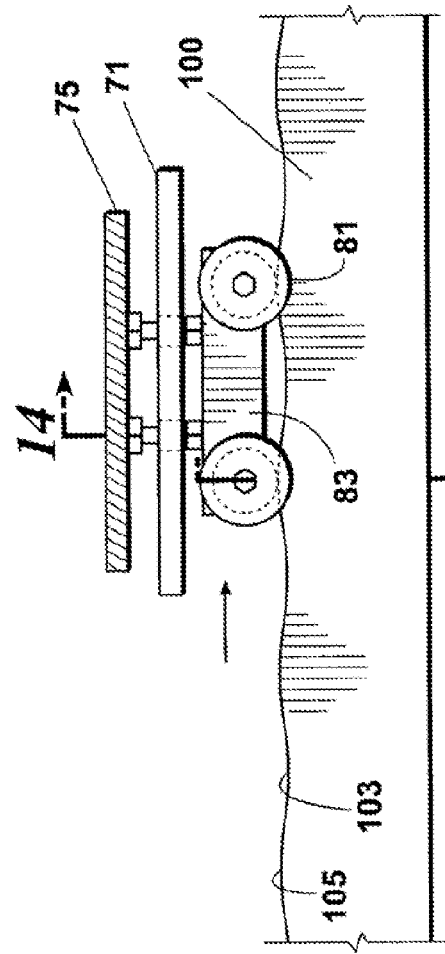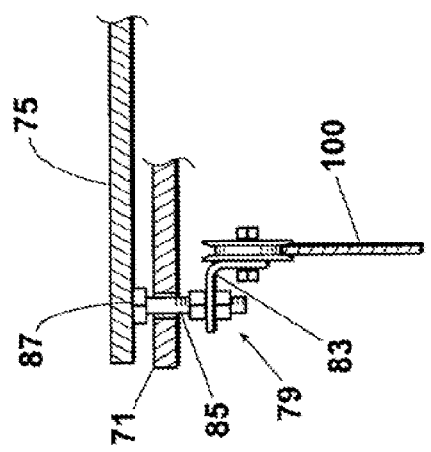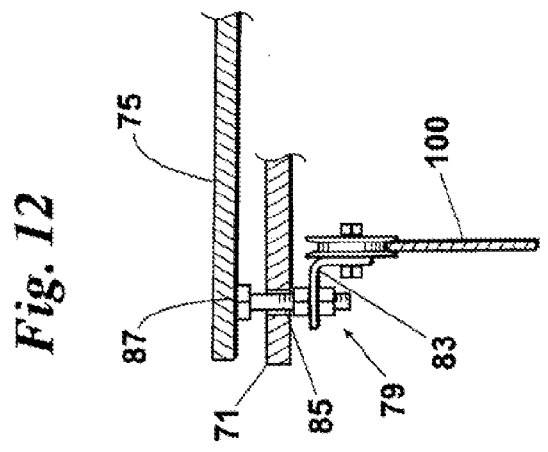

FOOTPRINT COMPARISON

CONVEYOR ACCUMULATOR FOR CONTROLLING THE FLOW OF ARTICLES BEING CONVEYED

CROSS-REFERENCE TO RELATED APPLICATIONS

This application is a divisional application of U.S. application Ser. No. 13/376,789, filed on Dec. 7, 2011, which issued as U.S. Pat. No. 9,212,008 on Dec. 15, 2015, which is a national phase of PCT/US2011/063577, filed Dec. 6, 2011, which is a continuation of U.S. application Ser. No. 12/961,176 filed on Dec. 6, 2010, and which are incorporated herein by reference in their entireties.

BACKGROUND OF THE INVENTION

Field of the Invention

This invention relates generally to power-driven conveyor systems. Specifically, the invention relates to horizontally oriented sections for accumulating items and controlling the flow of items moving between an upstream source and a downstream destination.

In production environments, balancing the flow between an upstream process or delivery station and a downstream process or receiving station is important. Accumulators have been utilized to accumulate articles when the downstream receiving station is either shut down or is operating at intake speed that is slower than the rate at which articles are being fed to it by the upstream delivery station. A problem with prior art horizontal accumulators is that the accumulators require a relatively large footprint to provide the needed buffer capacity (in some cases two to three times the footprint for a given capacity because of the drive and wheel arrangements), cannot accomplish a 90-degree transfer of articles in a direction of product flow without compressing the articles when the transfer device repositions itself upstream of its current position, and cannot independently and simultaneously control a plurality of lanes which provide buffer capacity between the in-feed and out-feed side of the accumulator. The shortcomings of these accumulators are especially problematic in high speed production operations such as those found in the food processing, handling and packaging industry.

One horizontal accumulator designed specifically for high-speed operations is disclosed in U.S. Pat. No. 4,513,858. The accumulator disclosed therein operates on a first-in-first-out (FIFO) principle so that regardless of whether the upstream or downstream station is malfunctioning, the articles exit the accumulator in the same order that they arrive. To achieve FIFO, the accumulator has a plurality of fixed pulley wheels located at each end which guide an endless carrier or conveyor along a serpentine path. Located between the fixed pulley wheels is a plurality of interconnected pairs of pulley wheels which also help guide the endless conveyor. A slide assembly connects each of the interconnected pairs. The slide assemblies move toward one end of the accumulator or the other and carry the interconnected pair along to provide more or less carrying capacity and, therefore, more or less travel time between the in-feed and out-feed side of the accumulator.

A rather complicated in-feed and out-feed drive mechanism controls, respectively, the accumulation of the incoming and outgoing items. These two drive mechanisms, which are located on opposing sides of the accumulator, must always rotate opposite one another. Further, the mechanisms require a number of pulley wheels and belts to achieve the desired direction of endless conveyor travel. Periodic reversals of direction and looping are needed to prevent slack in the endless conveyor.

Because of the above arrangement, each interconnected pair of pulley wheels rotates when at least one of the in-feed or out-feed side drive mechanisms is engaged because one or more of the fixed pulley wheels are being driven by the engaged drive mechanism. The only way to stop the rotation of the interconnected pair of pulley wheels is to idle or stop both the in-feed and out-feed drive mechanisms. Therefore, when one or both of the drive mechanisms is engaged, product is always advancing toward the out-feed side of the accumulator regardless of whether the interconnected pair of pulley wheels is advancing toward one end of the accumulator.

Additionally, in order for the interconnected pair of pulley wheels to shorten or lengthen the exposed length of the endless conveyor in response to a speed difference between the drive mechanisms, they must move in the same direction of travel and pull the endless conveyor toward one end or the other. If the fixed pulleys, which essentially pin the endless conveyor at each end, were replaced by a sprocket arrangement, the only way to create a speed difference between the interconnected pair of pulley wheels would be to place the drive mechanisms on opposite ends of the accumulator, with one drive mechanism driving one of the pulley wheels in the pair and the other drive mechanism driving the other wheel. Additionally, the pair of pulley wheels by themselves cannot reverse travel without losing the conveyor because the slide assembly is a fixed body with no means, such as spring loading, to compensate for slack in the conveyor when reversing the travel. Lastly, this accumulator is highly questionable at best for use in high speed operations, and is mostly likely not at all suitable for use in high speed operations.

Another horizontal accumulator which is suitable for high-speed operations is disclosed in DE Pat. No. 103 12 695. A commercial embodiment of this accumulator is the MEURER HSP™ horizontal buffer (Meurer Verpackungssysteme GmbH & Co. KG, Fürstenau, DE). The accumulator has an in-feed transfer unit, a mirror-image out-feed transfer unit and a plurality of storage lines or lanes located between the in-feed and out-feed transfer units. The transfer of articles is direct between the transfer units and the plurality of lanes.

Because of its design, the accumulator has a number of limitations. The design is complex, requiring a relatively large number of parts. Articles being carried on the in-feed and out-feed units must be carried across a long dead plate by many small belts which can fail, leading to article damage. Additionally, the design requires a lot of safety covers which limit access and make maintenance more difficult.

Another limitation of the accumulator is that the in-feed and out-feed transfer devices take product directly from a running conveyor with no means to alter, control or absorb the flow. As such, the incremental indexing of the transfer unit on the in-feed side from one storage lane to an adjacent storage lane of the accumulator during loading must occur against the article flow because if it is instead incrementally indexed in the direction of the flow, significant article compression would occur when the transfer unit thereafter transfers back directly from the last to the first lane. In other words, to avoid significant article compression, the transfer unit travels with the article flow when it transfers back directly from the last to the first lane, and therefore travels against the flow when incrementally indexing. The designers, therefore, traded off compressing the articles slightly but more frequently versus compressing them more greatly but less often. Even so, at least some article compression occurs on the in-feed side during the incremental indexing because it does occur against the article flow. Article compression is particularly problematic because compression can cause damage to the article or its packaging.

In a similar manner, this accumulator also creates gaps in article flow on the out-feed side because it has no means to compensate for the travel time required for the out-feed transfer unit to reposition itself. Moreover, because two storage lanes cannot simultaneously start, any time the downstream receiving station goes down the in-feed transfer unit must immediately index, thereby creating a gap in article flow when conveying is resumed.

Additionally, it is difficult to offer different in-feed and out-feed locations. The transfer unit either indexes from one lane to the next against product flow or travels with product flow to move from the last to the first lane. There is no disclosed control means for repositioning the transfer unit from the last lane to the second-to-last lane or repositioning the transfer unit from any lane to any given other lane upstream or downstream of its current lane position. Lastly, the transfer unit cannot move independently of the in-feed or out-feed conveyor.

The only way for the accumulator to control the flow of articles when the downstream receiving station malfunctions is to stop the transfer unit on the out-feed side, reduce the speed of the lane until it is filled, and then stop this lane and start a second, adjacent lane. Neither the in-feed unit nor the out-feed unit can adjust the length of exposed carrying surface to provide momentary, additional buffer capacity. Further, neither transfer unit can retrace its path without causing product compression.

Still yet another limitation of the accumulator is that it relies upon a complex drive pinion and drive motor arrangement. The drive motors are pivotally arranged on moveable carriages such that the motors can be independently connected to each of the drive pinions. A complex belt and pulley idler or clutch arrangement resides between the motors and the drive pinion. When the drive pinion engages, it moves a lane from an idle state to a travel state. Although one lane can move from travel to idle as another lane moves from idle to travel, only one lane can be in the travel state at any given time. The accumulator cannot run two lanes simultaneously nor can it accelerate one lane as another decelerates.

Yet another accumulator is disclosed in U.S. Pat. No. 6,725,998, which stores accumulated articles in a vertical spiral and uses a transport member to adjust the buffer capacity of the accumulator. A commercial embodiment of this accumulator is the 6400 DYNAC® accumulator which at the time of filing of the parent application referenced above was made and sold by Hartness International, Inc. (Greenville, S.C.).

The transport member moves along a path parallel to an in-feed conveyor and an out-feed conveyor and deflects articles from the in-feed to the out-feed conveyor. Depending on the relative speeds of the two conveyors, the transport member moves to increase or decrease the quantity of items which can be stored on the conveyors. However, each conveyor extends past the transport member and there is no conveyor looping around the transport member. The exposed length of conveyor on both the in-feed and out-feed side remains constant but the available length for storage changes based upon the relative position of the transport member. Further, the in-feed storage capacity cannot change independently of the out-feed storage capacity and vice versa. Although the vertical spiral and transport member arrangement performs well for its intended purpose, the conveying speed is limited by amongst other things incline and inertia.

Also, the 180° transfer from one conveyor to the other can be difficult because the transfer takes place along curves and at angles and the articles must be gripped, lifted, moved and placed.

SUMMARY OF THE INVENTION

A system and method of providing accumulation and flow control between an upstream delivery station and a downstream receiving station includes an in-feed accumulator, a mass storage accumulator, and an out-feed accumulator. Articles processed by the upstream delivery station are accumulated on or conveyed by the in-feed accumulator and then transferred to one of the lanes of the mass storage accumulator. This transfer is indirect, resulting in a direction of article flow different than that of article flow on the in-feed accumulator. Articles being accumulated on and conveyed by the mass storage accumulator are then transferred onto an out-feed accumulator. This transfer is also indirect, resulting in a direction of article flow different than that of the mass storage accumulator.

The in-feed and out-feed accumulators ("the feed accumulators") each have an endless conveyor that moves between first second positions. As each of the endless conveyors moves between different positions, the length of its exposed carrying surface, and therefore its carrying capacity, changes. During its travel between the first and second position, the conveyor may be transporting product faster, slower, or at the same rate as its carrying capacity is growing or shrinking. The ability of the endless conveyor to extend or retract allows the feed accumulator to maintain a constant density of article flow. Additionally, the endless conveyor can momentarily reverse its direction of rotation, as needed when the transfer device moves against the flow of articles, thereby providing additional time for the transfer device to reposition itself before receiving additional articles.

The endless conveyor of the feed accumulator is preferably guided by first and second U-turn wheels, located in different horizontal planes, and being linked to each other in a manner such that they translate in equal and opposite directions relative to each other. A first and second drive motor, preferably located on a single end of the feed accumulator, control the position and rotational speed of the U-turn wheels. The position and rotation of the endless conveyor responds to a speed difference and/or a rotational speed difference between the first and second motors. As the length of the exposed carrying surface increases, the length of the unexposed carrying surface decreases, and vice versa.

The indirect transfer between the feed accumulator and the mass storage accumulator occurs by way of an intermediate transfer device that moves independently from the endless conveyor of the in-feed accumulator. The transfer device preferably indexes in the direction of article flow. As the transfer device indexes between a first and second position, the density of article flow is not affected. In other words, indexing does not compress or alter the spacing between the articles. Because the endless conveyor moves independently from the transfer device, it can extend or retract to accommodate indexing of the transfer device and compensate for the indexing time. The endless conveyor may also reverse its travel when the conveyor retracts to allow the transfer device additional time to position itself.

The transfer device is preferably a transfer apparatus having a lane defined by first and second curved vertical surfaces that guide articles flowing into the mass storage accumulator and change their direction of travel. The first and second curved surfaces may take many forms. For example, the first curved surface may be a vertically oriented rail and the second curved surface may be a vertically oriented endless belt with a plurality of flexible fins. To prevent interference between the transfer apparatus and the mass storage accumulator, as the transfer apparatus indexes to a different lane of the mass storage accumulator, a pivot or lifting mechanism is preferably provided for raising the nose end of the transfer apparatus so it clears the conveying sections which define each lane. The lifting mechanism is preferably a roller and cam plate arrangement.

The mass storage accumulator preferably includes a plurality of independent conveyor lanes. Each lane may be selectively driven by either of two motors. The first motor may be a different rated motor than the second motor. The first motor preferably serves as a receiving motor for driving a lane when products are being loading onto said lane, and the second motor preferably serves as a discharge motor for driving a lane when products are being loading onto said lane. Each lane in the plurality of lanes preferably has its own first and second clutches, one of which is preferably operatively connected to the first motor and the other of which is preferably connected to the second motor. The first clutches of all lanes are preferably operatively connected to the first drive motor via a common drive shaft or axle. Similarly, all of the second clutches are preferably operatively connected to the second drive motor via another common drive shaft. The two drive motors are not necessarily always running but could be, as needed.

Because the clutches for each lane are connected in series, and because each lane can be operatively connected to the receiving motor or the discharge motor via the clutches, two or more lanes can simultaneously, instantaneously, and independently move between various states as the respective first or second clutch of the lane engages or disengages and as the receiving and discharging motors vary their speeds. For example, one lane driven by the first motor can stop or decelerate as another lane driven by the second motor starts or accelerates; one lane can be running at a different speed than another lane as each can be driven by a different motor; or two lanes driven by the same motor can simultaneously stop at the same time that a different two lanes driven by the other motor simultaneously start. Of course these functions could be performed instead by providing each lane with its own drive motor, but the costs would be far greater.

The in-feed accumulator may be modified for use as a stand-alone accumulator without the need for the mass storage accumulator. When used as a stand-alone accumulator, the transfer is direct between the in-feed and out-feed portions of its endless conveyor, and thus also between the upstream delivery station and the downstream receiving station, respectively. The central portion of the feed accumulator includes the upper and lower U-turn wheels which guide the endless conveyor and traverse in a direction adjacent to the in-feed and out-feed portions of the endless conveyor, thereby extending and retracting the length of exposed endless conveyor. Alternatively, non-rotating guides could be used in place of the wheels to direct the conveyor around the U-turns.

The present invention provides for a horizontal accumulator having many advantages. It provides a much larger accumulation capacity in a much smaller footprint relative to many other horizontal prior art accumulators. The accumulator lends itself to modular design and, therefore, is easier and less costly to size, install, retrofit, maintain, or repair according to a particular application than many prior art accumulators. The accumulator allows for optimal in-feed and out-feed locations depending on the current state of the upstream delivery station, downstream receiving station and the accumulator itself. The accumulator accommodates and reduces inherent variability in article flow. In other words, the accumulator maintains or provides a relatively constant flow density of articles and does not create variability in article flow due to how it accumulates, transfers and conveys articles. The accumulator transfers items from one accumulator to another without the conveyor sliding under the article, compressing adjacent articles, or in any way damaging the articles being conveyed and transferred. The accumulator ensures no damage to the product during indexing of the transfer device. The accumulator isolates questionable articles in position for rework or auto-pulls audit samples, if required. The accumulator allows two or more conveying lanes to simultaneously, instantaneously, and independently change their respective conveying states. The accumulator eliminates the use of water or dry lubricant and tolerates any line lubricant carryover. The accumulator is characterized by a smaller shipping volume and, therefore, has less shipping cost. The accumulator reduces operational cost, eliminates or minimizes the use of doors, and provides improved maintenance access and fewer safety issues. The accumulator is able to handle high product flow rates. And still further, the accumulator can be used to transfer items which, due to instability, could not transferred using prior art accumulators.

BRIEF DESCRIPTION OF THE DRAWINGS

FIG. 11 is a partial elevational view of the nose end of the intermediate transfer device of FIG. 5 when positioned to transfer articles between a feed side accumulator and one lane of the mass storage accumulator.

FIG. 12 is a view taken along section line 12-12 of FIG. 11. The nose end of the intermediate transfer device includes lifting means in communication with a cam plate. When the lifting means are positioned over the low cam positions of the cam plate, the nose end of the transfer device is in a substantially horizontal orientation.

FIG. 13 is a partial elevational view of nose end of intermediate transfer device of FIG. 5 as it indexes from one lane to the next lane. As the transfer device indexes from one lane to the next, the lifting means lifts the nose end of the transfer device to avoid any interference with the carrier segments of the mass storage accumulator.

FIG. 14 is a view taken along section line 14-14 of FIG. 13. When the lifting means are positioned over the high cam positions of the cam plate, the nose end of the transfer device pivots or raises upward.

Figure 1:
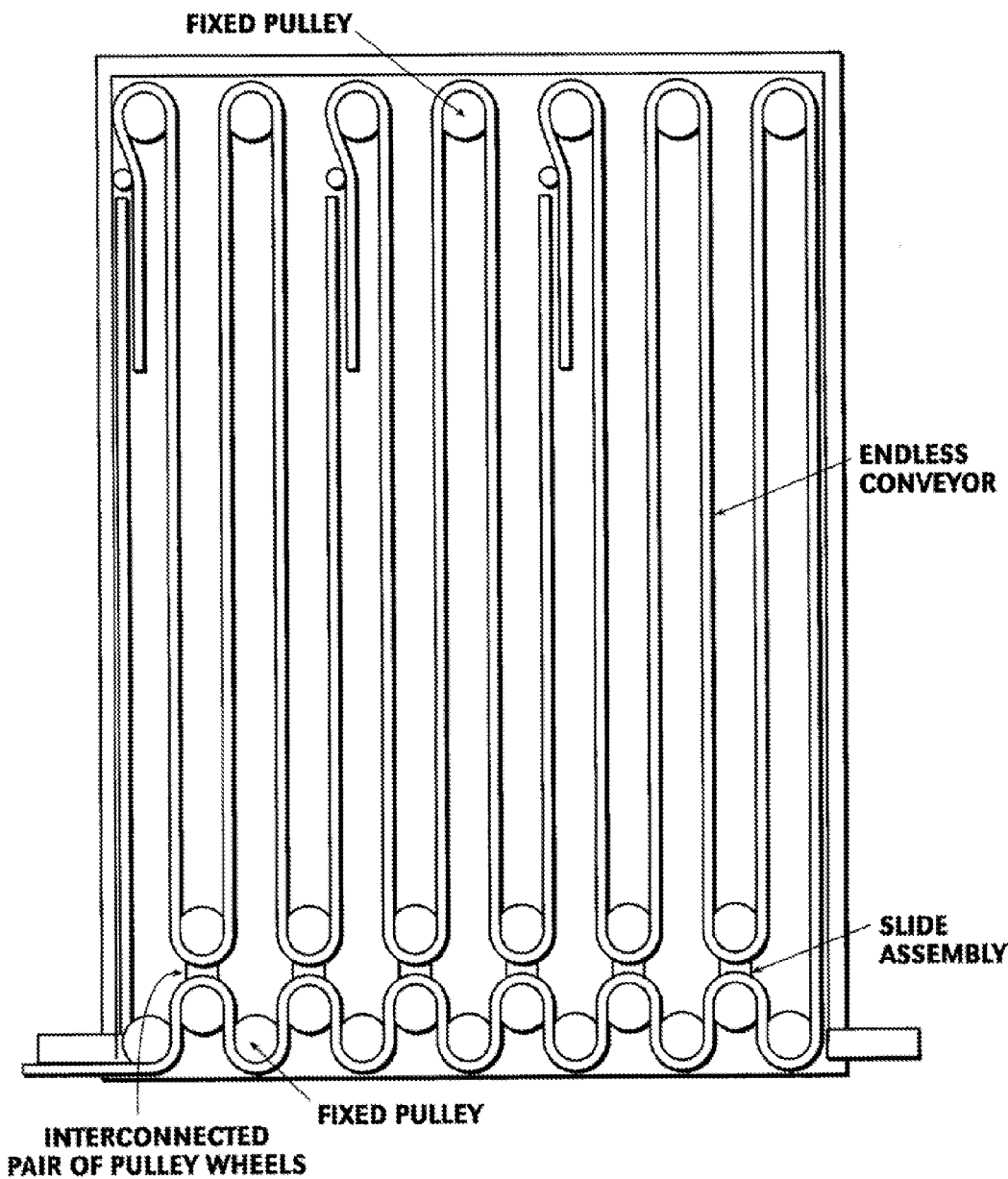
FIG. 1 is top plan view of a prior art accumulator in accordance with U.S. Pat. No. 4,513,858. The accumulator has a plurality of interconnected paired pulley wheels located adjacent one another in the same horizontal plane. An endless carrier or conveyor is guided along a serpentine path by the paired pulley wheels and a plurality of fixed pulley wheels located at each end of the accumulator. An in-feed and out-feed drive mechanism, located on opposite ends of the accumulator, drive the endless conveyor. The interconnected pair of pulley wheels responds to a speed difference between the drive mechanisms and pulls the endless conveyor toward one end of the accumulator. The length of the exposed carrying surface provided by the endless conveyor, and therefore its carrying capacity, remains fixed but is reallocated between the in-feed side and out-feed side as the situation requires.

The preferred embodiments illustrated in the drawing will be described with reference to the following element numbers:

10 Horizontal accumulator
20 In-feed/out-feed accumulator
21 Endless carrier or conveyor
23 Carrier segment
25 Sprocket-and-wheel arrangement
27 U-turn wheel
29 Platform or plate for 27
31 Channel
33 Housing
35 First end of 33
37 Second end of 33
39 Drive motor
41 Tether or cable
43 Spring
50 Mass storage device or accumulator
51 Storage line or lane
53 Endless carrier or conveyor
55 Carrier segment
57 Gap or space between adjacent lanes 51
59 Electro-magnetic clutch
61 Shaft or axle
63 Drive motor
65 Sprocket
67 Left or right side of 50
69 Shaft or axle
70 Intermediate transfer device
71 transfer member
73 Belt in communication with transfer member 71
75 Nose end
77 Lower surface of 75
79 Lifting means
81 Roller
83 Bracket
85 Fastener
87 Upper end of 83
89 First curved surface of 70
91 Lane
93 Entry portion of lane 89
95 Second curved surface
97 Endless belt
99 Flexible fins
100 Cam plate
101 Undulating upper surface
103 Low cam or low cam position
105 High cam or high cam position
113 Photo-optic or photo-electric eye
PE1-5 Photocells
S1-4 Servo motors
E1-4 Encoders

DETAILED DESCRIPTION OF THE PREFERRED EMBODIMENTS

Figure 17:
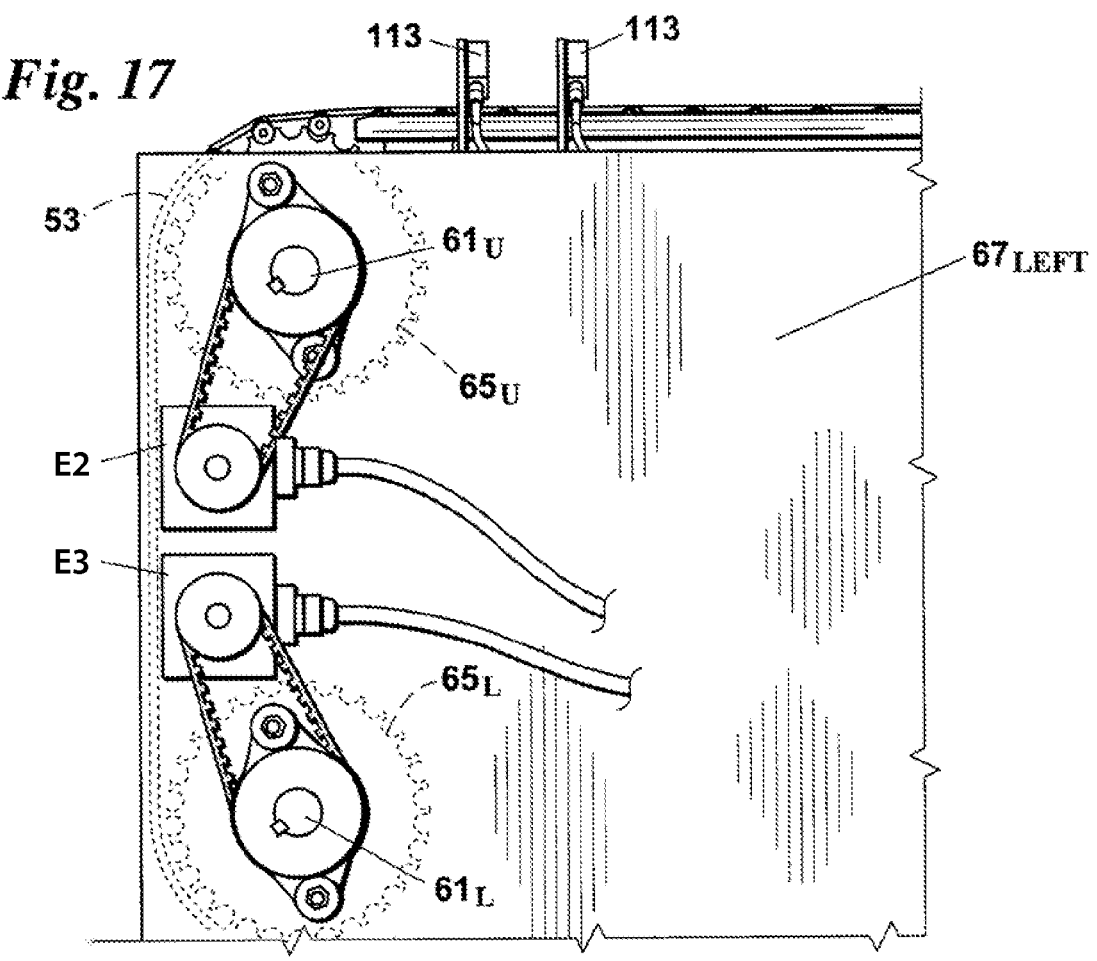
FIG. 17 is a side elevational view of the plurality of lanes of FIG. 5, showing the side opposite to that shown in FIG. 16. Various sensors, such as photoelectric eyes, may be used to monitor and communicate information about the status and position of articles being conveyed by the lanes. Other sensors, such as encoders, may be used to monitor and communicate information about the number of revolutions of the upper and lower motor drive shafts.
Figure 7:
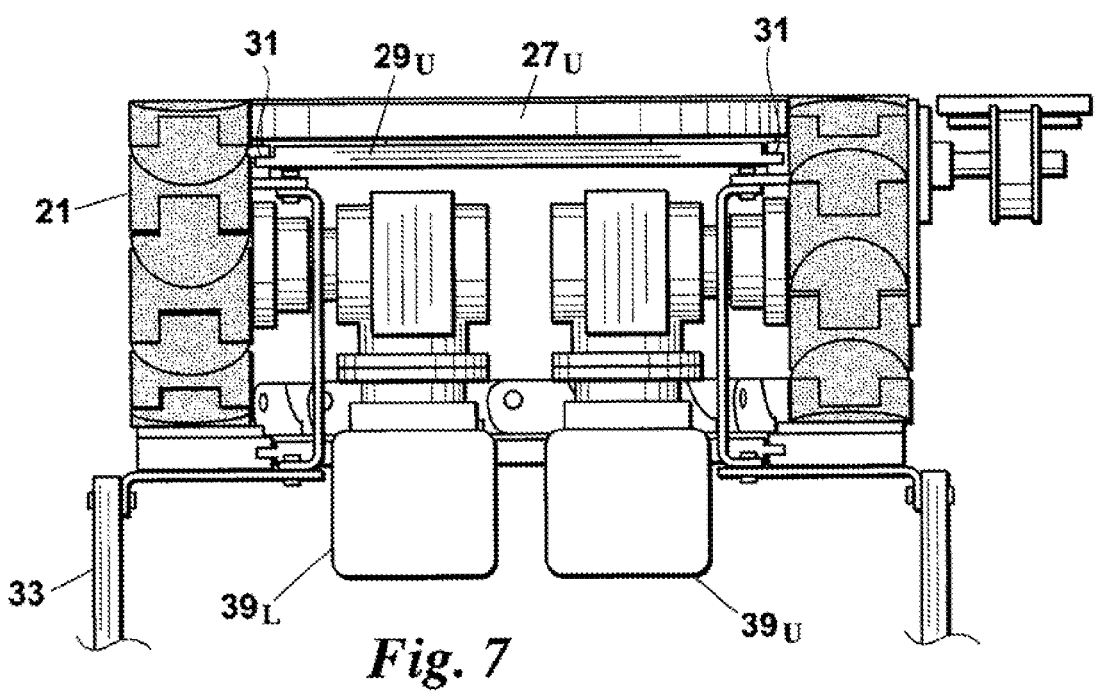
FIG. 7 is an elevational view of the drive motor end of the in-feed accumulator. One drive motor controls the speed and direction of the left half of its endless conveyor and another drive motor controls the speed and direction of the right half of the endless conveyor. The endless conveyor rotates and the U-turns move to different positions in response to speed and rotation differences between the two drive motors. When the motors drive the two halves of the endless conveyor in opposite directions and at the same speed, the U-turns of the endless conveyor maintain a constant position.
Figure 8:
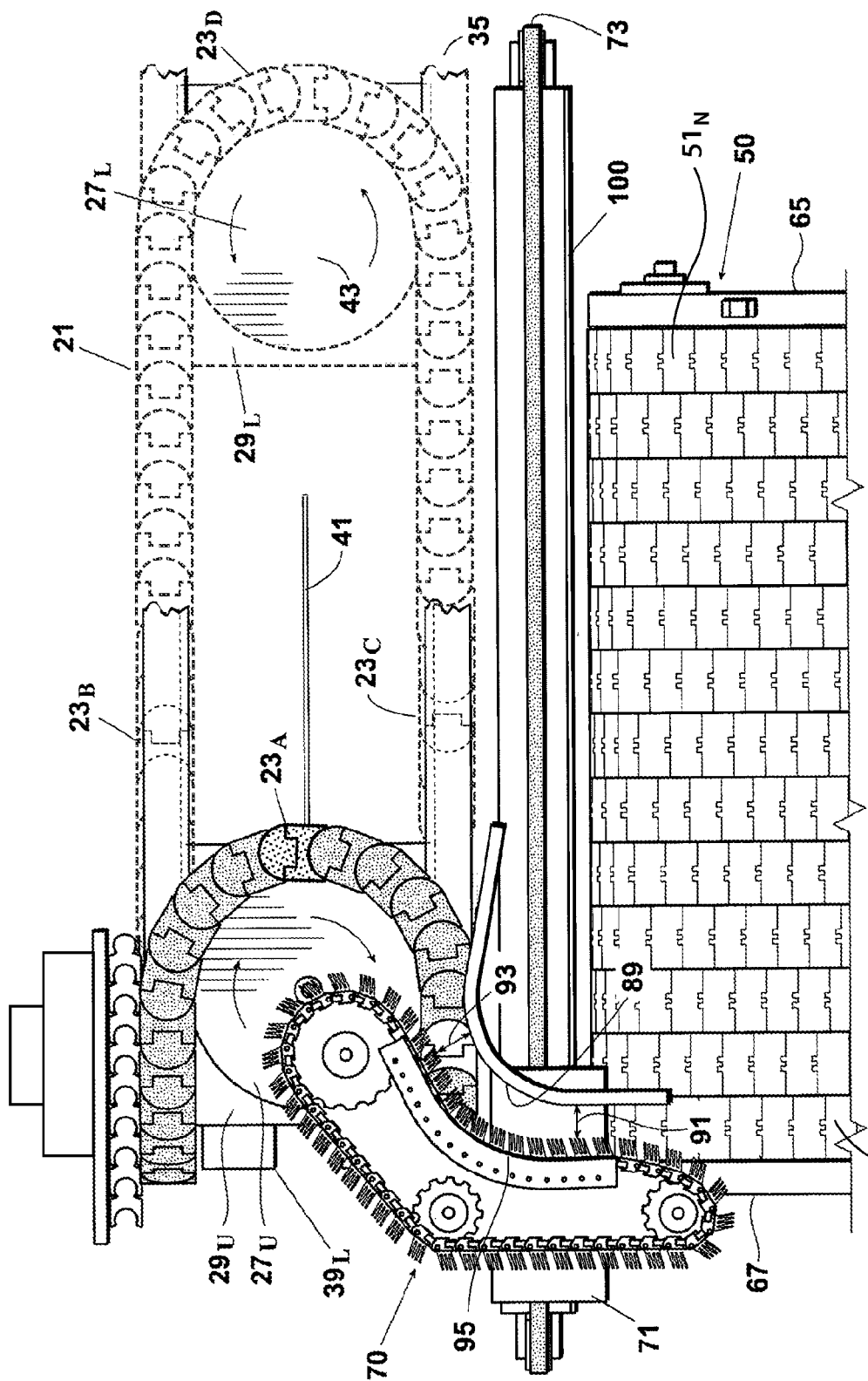
FIG. 8 is a top plan view of the in-feed accumulator of FIG. 5, illustrating the endless conveyor in a first position while rotating. Articles being conveyed flow along the upward facing portion of the endless conveyor and are transferred to a storage lane. When being repositioned, the upper and lower U-turns traverse in opposite directions and the endless conveyor extends or retracts.
Figure 9:
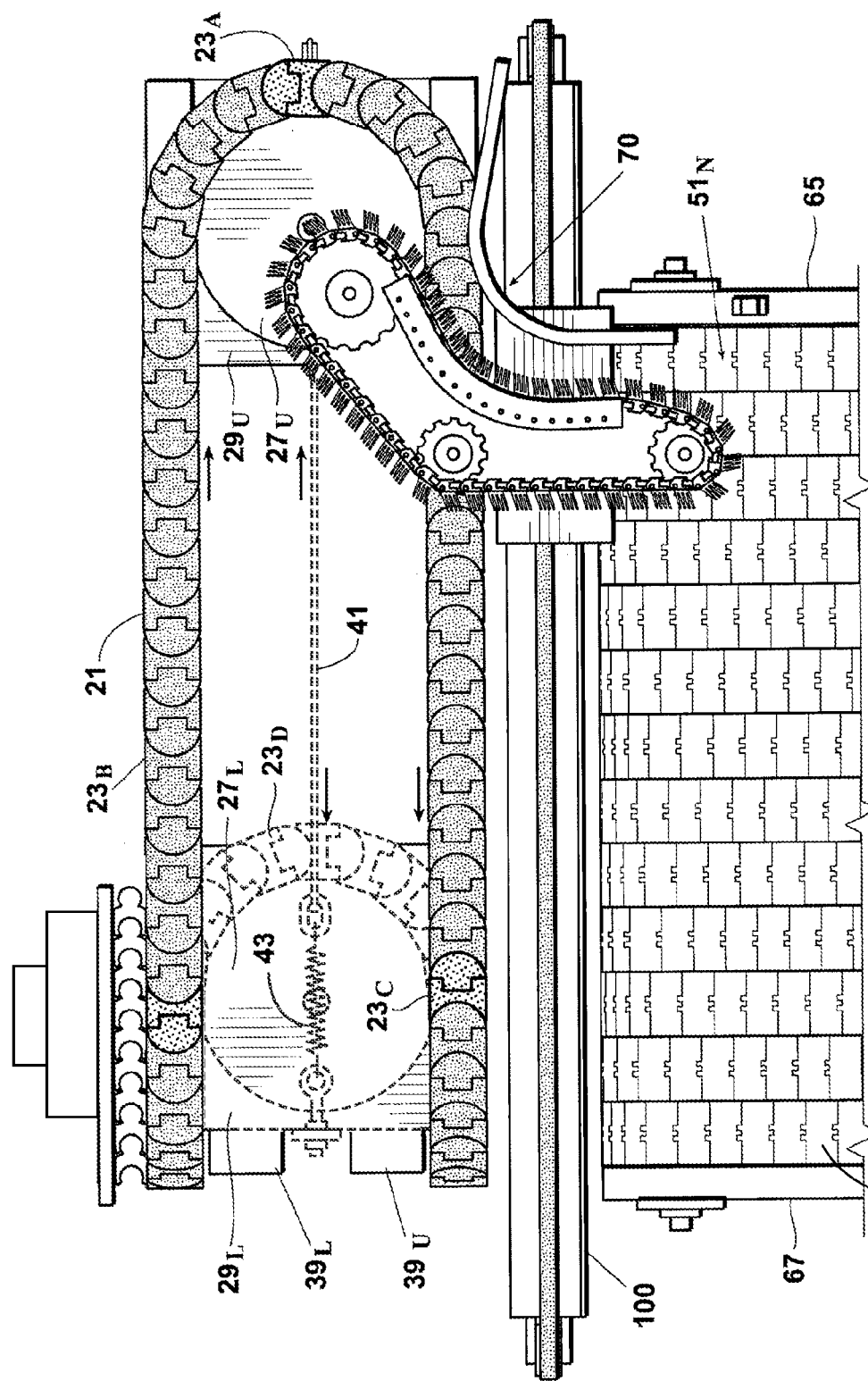
FIG. 9 is a top plan view of the in-feed accumulator of FIG. 5, illustrating the endless conveyor moving to a second position, while the U-turns remain stationary. During this reverse travel, the exposed individual carrier segments maintain the position relative the U-turn that each was in at the start of the reverse travel (see carrier segments $23_A$, $23_B$ and $23_C$ in FIGS. 8 and 9).
Figure 10:
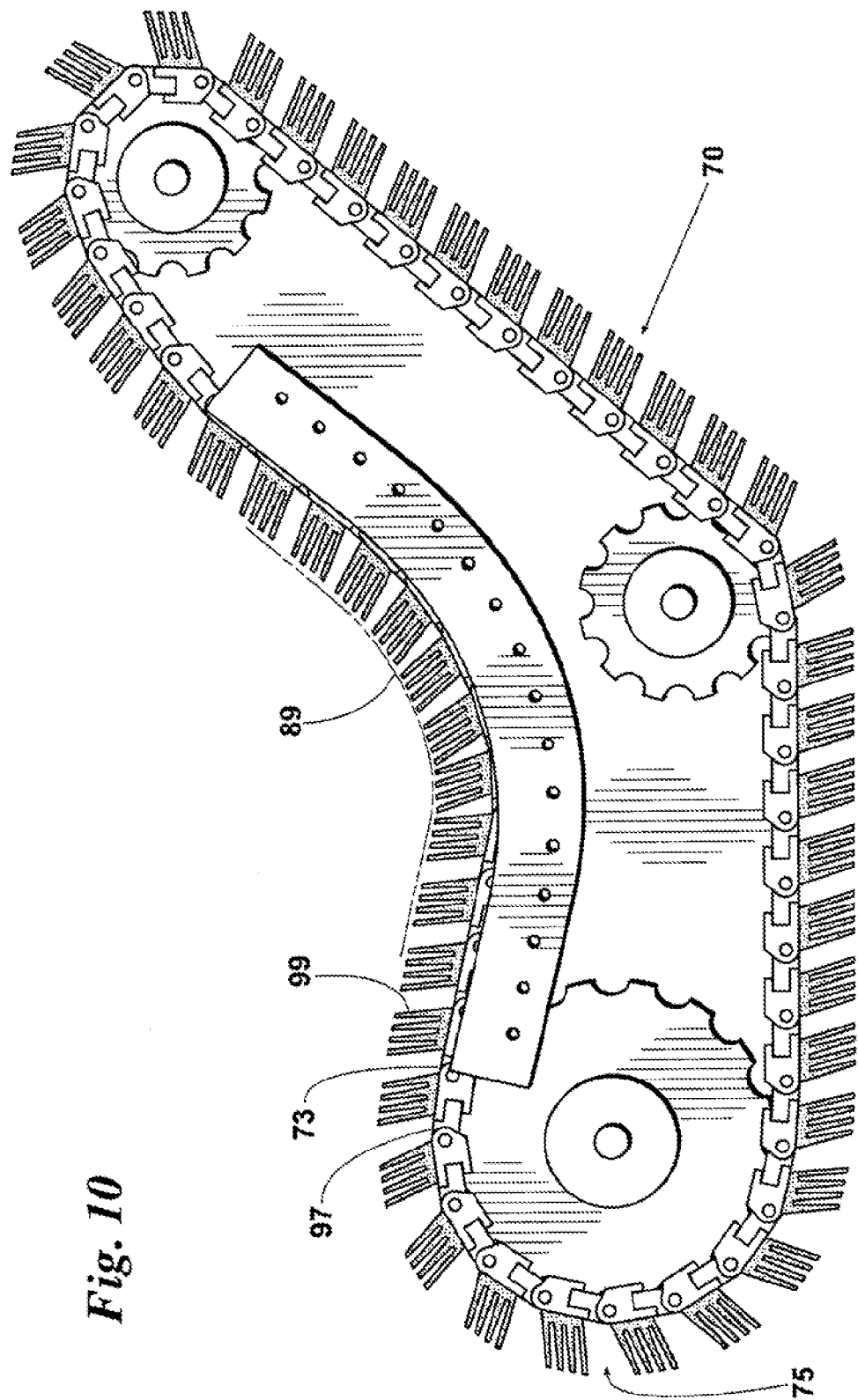
FIG. 10 is a top plan view of the intermediate transfer device shown on the accumulator shown in FIG. 5. The transfer device loads in the direction of the flow of articles and has mechanical means that allow it to reposition against the flow of articles without compressing the items (i.e., decreasing the spacing between items and causing items to touch). One curved surface of the transfer device is an endless belt having outward extending flexible ribs.
Figure 16:
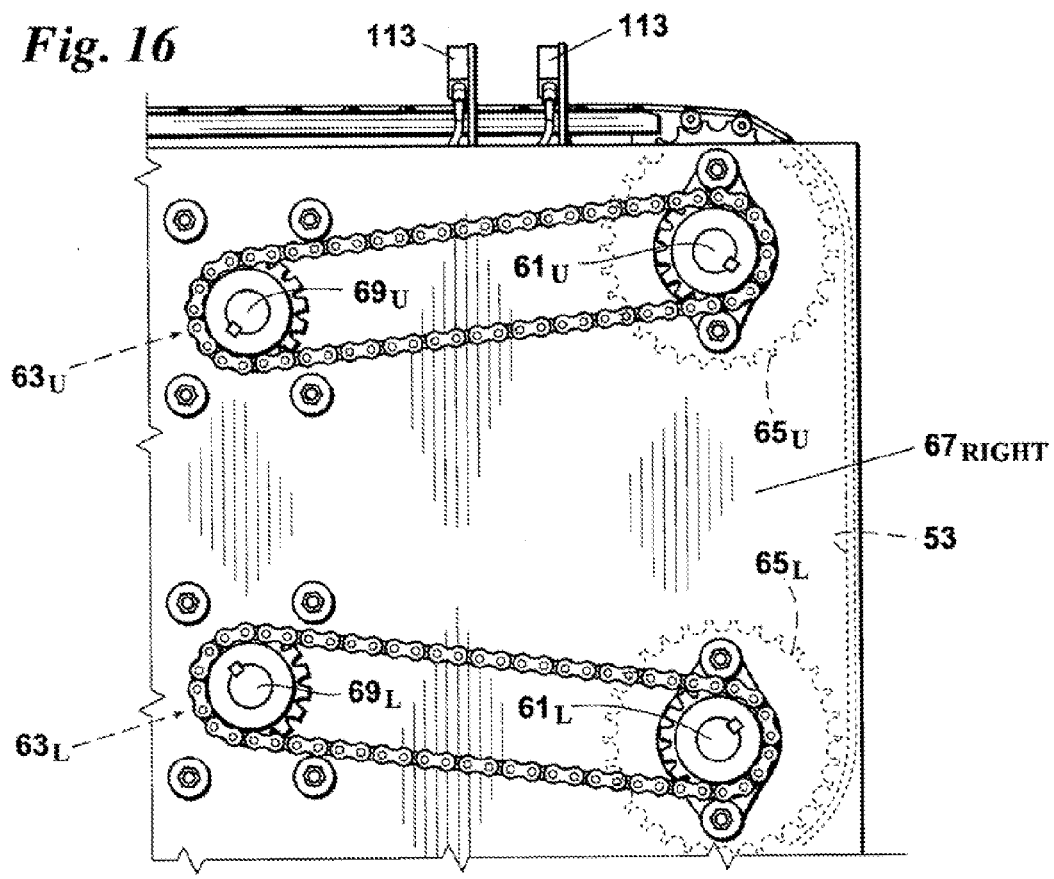
FIG. 16 is a side elevational view of the plurality of lanes shown in FIG. 5. Each lane can be driven by either its first or second clutch. Although the first and second clutches are shown as upper and lower clutches, they could also be located on opposite ends of the respective lane, side-by-side, or anywhere wherever is practical along the lane's endless conveyor. That being said, all of the upper clutches share a common axle driven by an upper drive motor and all of the lower clutches share an axle driven by a lower drive motor. The upper and lower drive motors may be different rated motors. Each clutch is independent of the other and moves between a disengaged and engaged state. When in the engaged state with the respective motor operating, the lane is in a conveying or travel state. For example, an upper or lower clutch in one lane may engage at the same time that an upper or lower clutch in another lane disengages. Two or more adjacent upper or lower clutches may be engaged at the same time to accommodate flow or create a wider lane.
Figure 15:
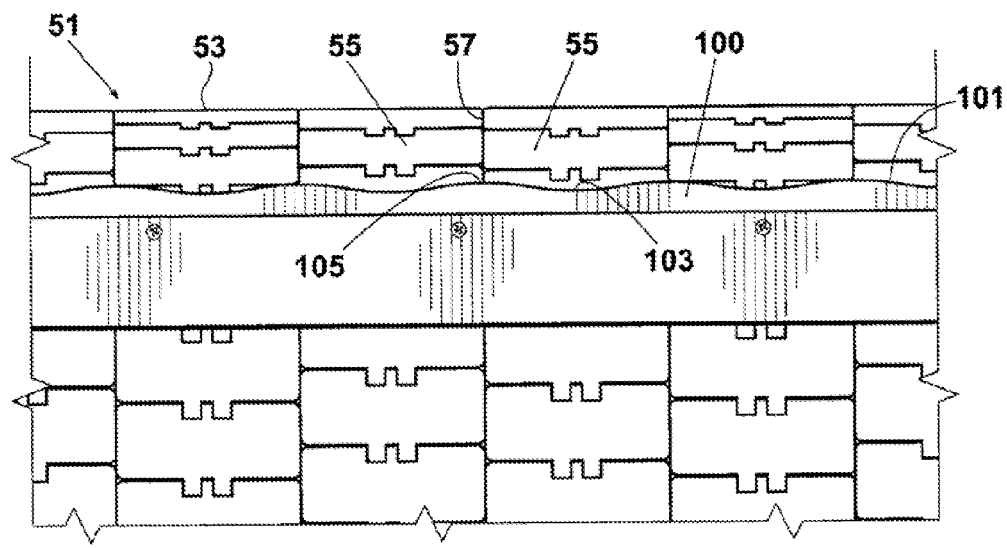
FIG. 15 is a partial elevational front view of the cam plate of FIGS. 11 to 14 relative to the mass storage accumulator of FIG. 5.
Figure 18:
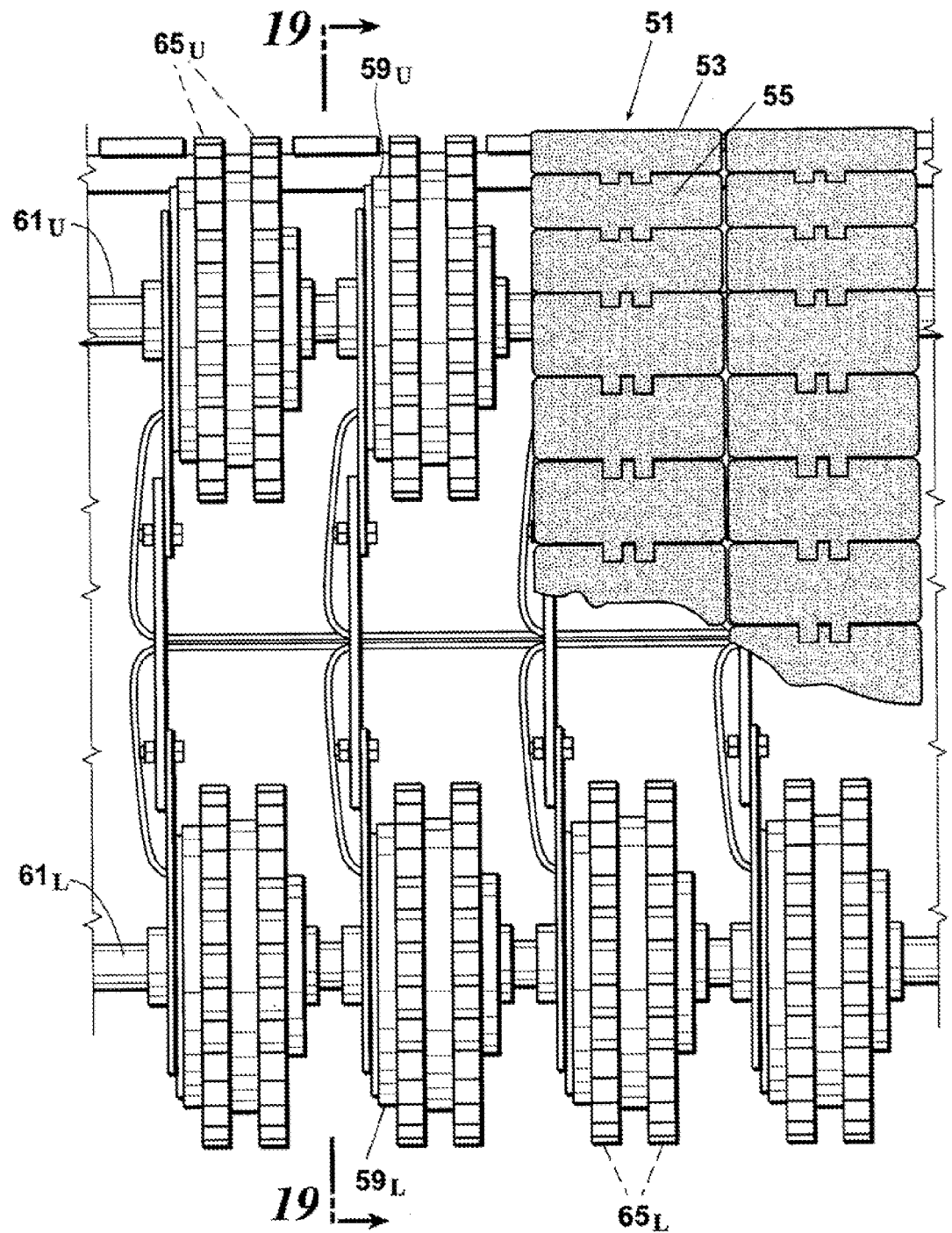
FIG. 18 is a partial cut-away elevational front view of the plurality of lanes of FIG. 5 at the out-feed end, illustrating each lane having an upper and lower clutch connected in series. A clutch may be bypassed without having to take the lane or the entire plurality of lanes out of service.
Figure 19:
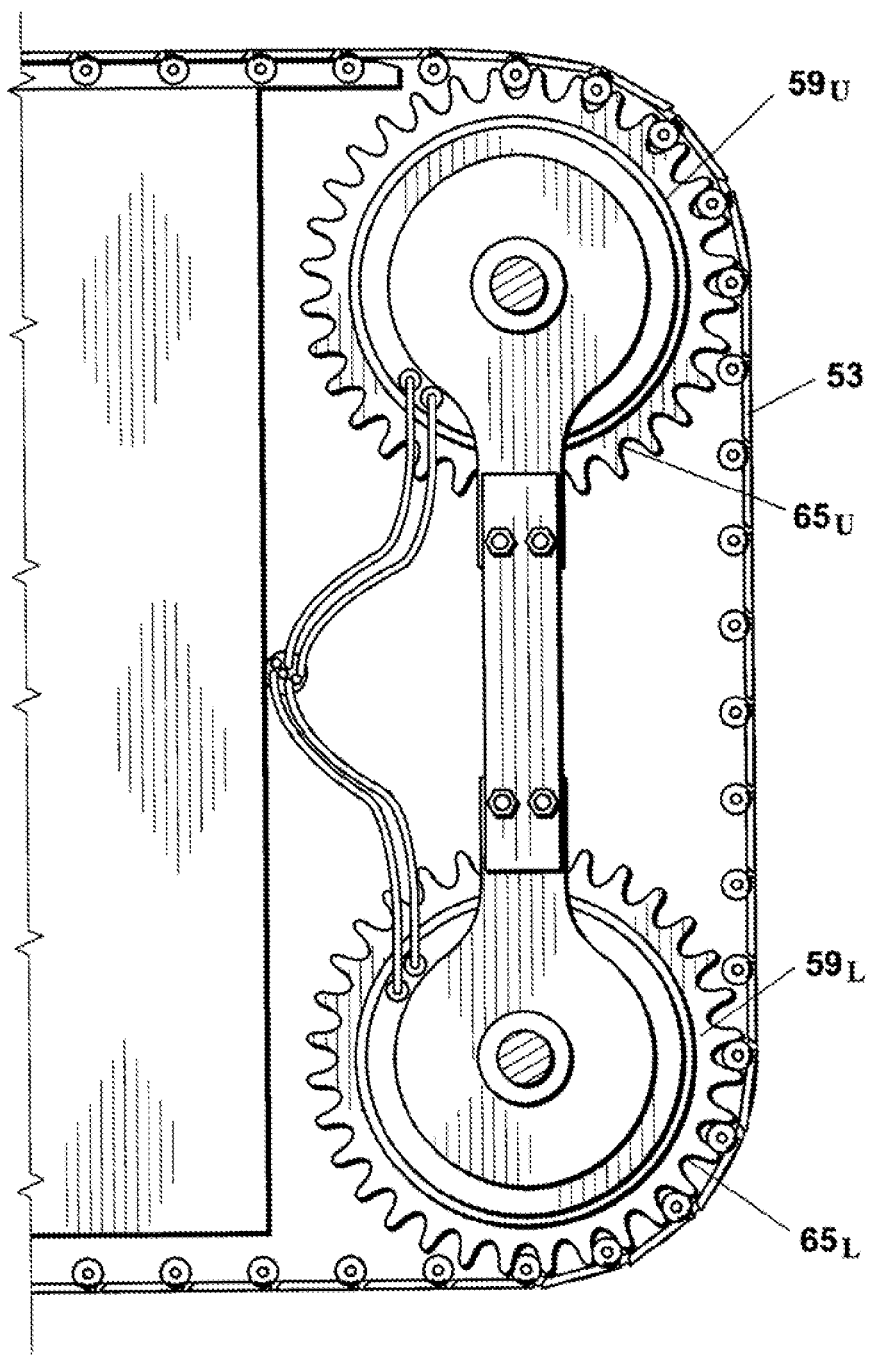
FIG. 19 is a view taken along section line 19-19 of FIG. 18, illustrating the arrangement of an upper and lower clutch pair.

A horizontal accumulator in accordance with this invention may be used in many different industries to control the rate of flow of articles between an upstream delivery station and a downstream receiving station. The accumulator is particularly well-adapted for use in applications involving an upstream delivery station, which may be a filling station for placing contents into a package, and a downstream receiving station in which the package may be placed in boxes. Because of its unique and inventive structure, the accumulator in comparison to prior art accumulators (see FIGS. 1 to 4) provides far greater programming flexibility and control to accommodate and reduce variability in article flow on both the in-feed and out-feed side of the accumulator. The accumulator also provides a carrying capacity equivalent to prior art horizontal accumulators but in a much smaller footprint (see FIGS. 16 to 18).

Figure 5:
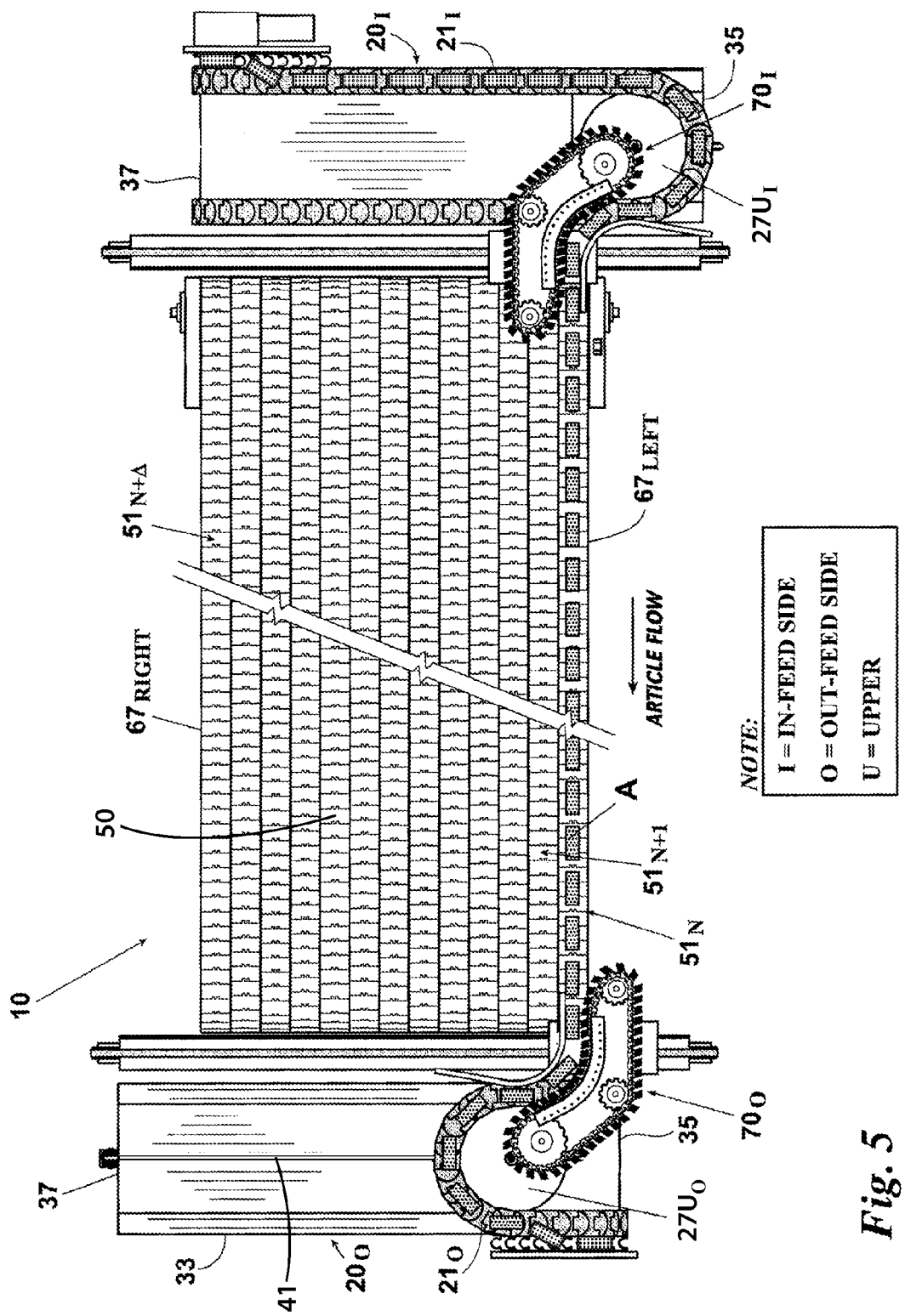
FIG. 5 is a top plan view of a preferred embodiment of a horizontal accumulator made according to this invention for controlling the flow of items between an upstream and down-stream processing operation. Accumulator capacity is provided by an in-feed and out-feed side accumulator and a mass storage device or accumulator having a plurality of storage lines or lanes located between the in-feed and out-feed accumulators. The transfer of items between the in-feed and out-feed accumulators and the plurality of lanes is not direct. Rather, the transfer occurs by way of an intermediate transfer device that provides accumulation and flow control and moves independently from the accumulator that it services. The in-feed and out-feed accumulators can adjust the length of its respective endless conveyor to provide more or less carrying capacity while the conveyor is not rotating. Under steady state flow conditions, both feed accumulators maintain the endless conveyor in a same position and the transfer device transfers items to and from the same lane in the plurality of lanes.
Figure 6:
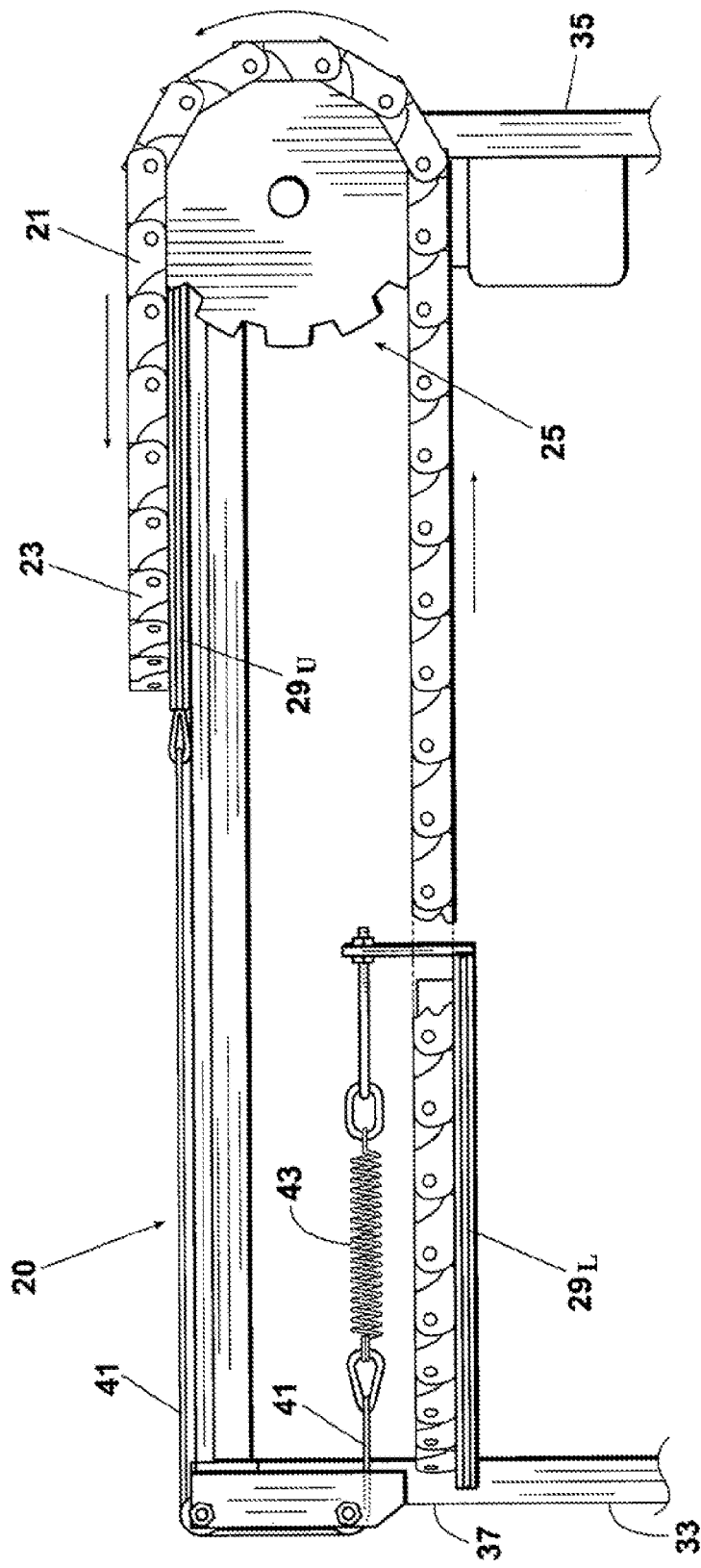
FIG. 6 is a side elevational view of the in-feed accumulator of FIG. 5 with the accumulator housing partially removed, the out-feed side accumulator being a mirror image. An endless conveyor is guided by two wheels physically and flexibly connected together and located in different horizontal planes.

Referring to the drawings, and first to FIG. 5, a preferred embodiment of a horizontal accumulator 10 made according to this invention includes a mass storage device or accumulator 50 located between an in-feed accumulator $20_I$ and an out-feed accumulator $20_O$. The in-feed accumulator $20_I$ is located at one end of mass storage accumulator 50 and the out-feed accumulator $20_O$ is located at the other end.

The accumulators $20_I$, 50, and $20_O$ collectively function as a "shock absorber" when the flow of articles being conveyed between the upstream delivery station and downstream receiving station becomes variable or "lumpy." Throughout this disclosure, such articles being conveyed are referred to as articles and are referenced in the drawing figures by the letter "A". The accumulators $20_I$, 50, and $20_O$ perform this shock absorbing function by working in concert to smooth out article flow when article flow does become lumpy, and by providing first-in-first-out article flow regardless of the current status of the upstream delivery station or the downstream processing station. Various sensors of types well-known in the art are used to collect status information and facilitate communication between and within the feed accumulators 20 and 50.

The mass storage accumulator 50 includes a plurality of storage lines or lanes 51 that provide most of the accumulation or buffer capacity of accumulator 10. The lanes 51 convey articles received from the in-feed accumulator $20_I$ to the out-feed accumulator $20_O$. The transfer of individual articles between the feed accumulator $20_{I or O}$ and the mass storage accumulator 50 is not direct. Rather, the transfer occurs by way of an intermediate transfer device 70 that moves independently relative to other portions of the accumulator 10 of the feed-side accumulator 20 that it services, thereby providing another means for accumulation and flow control.

In describing how this indirect transfer takes place, throughout this detailed description the current lane at which intermediate transfer device 70 is positioned is referred to as lane $51_N$, lane $51_{N+1}$ is the next lane in the direction of article flow, and lane $51_{N-1}$ is the next lane in the direction opposite that of article flow. On the in-feed side, the transfer device $70_I$ is positioned at the filling lane $51_N$. On the out-feed side, the transfer device $70_O$ is positioned at the emptying lane $51_N$.

Depending on the status of the upstream delivery station, the downstream delivery station, and the mass storage accumulator 50, the filling lane $51_N$ may be a different lane than the emptying lane $51_N$, with the respective intermediate transfer devices 70 being positioned accordingly. By way of example and referring to the lane nearest the left side $67_{LEFT}$ of the mass storage accumulator 50 as the first lane, the filling lane $51_N$ might be the first lane and the emptying lane $51_N$ might be the third or fourth lane. If the two lanes $51_N$ are different lanes, filling lane $51_N$ may be running at a different speed than the emptying lane $51_N$. Additionally, the transfer device 70 may need to index multiple lanes 51 on either the in-feed or out-feed side. For example, if the transfer device $70_I$ is positioned at the last lane (i.e., the lane furthest from the first lane), it may be necessary for the transfer device $70_I$ to index back to the first lane 51.

In general terms, the transfer device 70 is capable of indexing itself N+Δ or N−Δ lanes 51, where Δ is the lane increment (e.g. 1, 2, 3 . . . total lanes). There are two exceptions. When the transfer device 70 is positioned at the first lane 51, it cannot index in the negative direction because there are no more upstream lanes 51 to which to index. Similarly, when the transfer device 70 is positioned at the last lane 51 it cannot index in the positive direction because there are no more downstream lanes 51 to which to index.

The structure of the in-feed accumulator $20_I$ is the same as that of the out-feed accumulator $20_O$ in all respects. The only difference between the two feed accumulators $20_{I\&O}$ is that the in-feed side accumulator $20_I$ is under the control of in-feed side logic and is configured to receive articles from the upstream delivery station and send those articles to the mass accumulator 50 whereas the out-feed side accumulator $20_O$ is under the control of out-feed side logic and is configured to receive articles from the mass accumulator 50 and send those articles to the downstream receiving station. For ease of reference, throughout the remainder of this detailed description the in-feed and out-feed accumulators $20_{I\&O}$ are sometimes referred to as feed accumulator 20 or feed accumulators 20.

Because the intermediate transfer device 70 is independent of its respective feed side accumulator 20, the endless conveyor 21 of the feed side accumulator 20 can extend or retract (or extend and extend again or retract and retract again) between a first position and a second position as the transfer device 70 is moving in the same or opposite direction. For example, if the transfer device $70_I$ is transferring articles from the in-feed side accumulator $20_I$ to the mass storage accumulator 50 in the direction of article flow (which is preferable) and the transfer device $70_I$ needs to reposition or index to the next lane $51_{N+1}$, the endless conveyor $21_I$ can momentarily extend (move opposite the transfer device $70_I$) and then retract to accommodate the indexing time and close any increased spacing in article flow caused by the index. Therefore, the speed at which the conveyor $21_I$ extends may be different than the speed at which it retracts. Further, the speed at which the transfer device 70 indexes and the endless conveyor 21 extends or retracts may be different speeds. Additionally, regardless of whether the endless conveyor 21 is extending or retracting to accommodate indexing of the transfer device 70, the rotation of the conveyor 21 does not necessarily need to speed up or slow down.

Under steady state flow conditions like that shown in FIG. 5, both feed accumulators 20 maintain their respective endless conveyor 21 in a same position and each transfer device 70 services the same lane $51_N$ as the filling and emptying lane (the first lane 51 in this example). The endless conveyors 21 do not need to extend or retract from their current positions to accommodate either the rate of article flow, variability in article flow, or the indexing of the intermediate transfer device 70. Further, the intermediate transfer devices 70 does not need to reposition or index from one lane $51_N$ to a next lane $51_{N+1\ or\ N-1}$.

When steady state flow conditions are interrupted, the feed side accumulators 20 can each adjust the exposed length of its endless conveyor 21, as well as the speed of the endless conveyor 21, to provide different carrying capacity, different total transit time, or different carrying capacity and transit time. Adjusting the speed of endless conveyor 21 may include stopping the rotation of the conveyor 21 around its U-turn wheel 27 or guide as its exposed length is adjusted, which is done simply by operating both the left drive motor $39_L$ and the right drive motor $39_U$ at the same speed and in the same direction. Additionally, a filling or emptying lane $51_N$ of the mass storage accumulator 50 may be slowed down, speeded up or completely stopped and a next filing or emptying lane $51_{N+1\ or\ N-1}$ (or any other filling or emptying lane $51_{N+\Delta\ or\ N-\Delta}$) simultaneously, instantaneously and independently started.

When the filling lane $51_N$ is full of articles or stopped, the intermediate transfer device 70 on the in-feed side indexes to the next available filling lane $51_{N+\Delta\ or\ N-\Delta}$. Further, two lanes 51 may be running at the same time and at different speeds (or at different rates of acceleration and deceleration), and may be simultaneously, instantaneously, and independently started.

Referring to FIGS. 5 to 9, the endless conveyor 21, which may be constructed of linked carrier segments 23, is guided by a sprocket-and-wheel arrangement 25 that places one portion of the conveyor 21 in a different horizontal plane than the remaining portion. A curved rail (not shown) guides articles being carried by endless conveyor 21 as the articles move around the U-turn wheels $27_U$. It should be appreciated that although in the preferred embodiment of the invention, the conveyor extends around U-turn wheels, the U-turns could also extend partially around non-rotatable guides. Moreover, the U-turns need not necessary have a semicircular shape and could comprise several smaller turns with various shapes. That being said, the wheels $27_{U\&L}$ each ride on a respective platform or plate 29 received by opposing longitudinally extending channels 31 of the accumulator housing 33. The movement of the plate 29 is responsive to its wheel 27 and the speed and rotational differences between the motors $39_{U\&L}$. Each plate 29 is tethered to the other plate 29 by a cable 41, thereby placing the wheels $27_{U\&L}$ in a master-slave relation to one another (i.e., when one wheel is forced to move, the other must also move).

Because of the master-slave relation, when the upper wheel $27_U$ of the in-feed accumulator $20_I$ traverses toward the first end 35 of the accumulator housing 33, the lower wheel $27_L$ traverses toward the second end 37 and the endless conveyor 21 extends between first and second positions. Conversely, when the upper wheel $27_U$ traverses toward the second end 37, the other wheel $27_L$ traverses toward the first end 35 and the endless conveyor 21 retracts between a second and first position. In general terms, the total exposed length of the in-feed endless conveyor 21 is at a maximum when its upper wheel $27_U$ (and therefore its upper plate $29_U$) is at the end of its travel toward the first end 35 of housing 33 and wheel Vu (and therefore plate $29_U$) is at the end of its travel toward the second end 37 of housing 33. Similarly, the total exposed length is at its minimum when the upper wheel $27_U$ is at the end of its travel toward the second end 37 of housing 33 and the other wheel 27 is at the end of its travel toward the first end 35 of housing 33.

Although the wheels 27 are in a master-slave relation, each wheel $27_{UorL}$ is driven independently of the other wheel $27_{LorU}$ by its respective drive motor $39_{UorL}$. Because each wheel 27 responds to a speed and rotation of its drive motor 39, and because the wheels 27 are in a master-slave relation to one another, the position and direction of rotation of the endless conveyor 21 responds to a speed "V" and rotational "R" difference of the drive motors 39. Preferably, one of the drive motors $39_{UorL}$ runs at a constant speed and serves as a governor with the speed of the other drive motor 39 being varied according to current feed conditions. The speed of the motor 39 serving as the governor on the in-feed side is set according to the in-coming feed rate. On the out-feed side, the governor motor 39 is set according to the out-going feed rate.

The effect of the drive motors 39 on the endless conveyor 21 is summarized below in the following table:

TABLE 1

Figure 24:
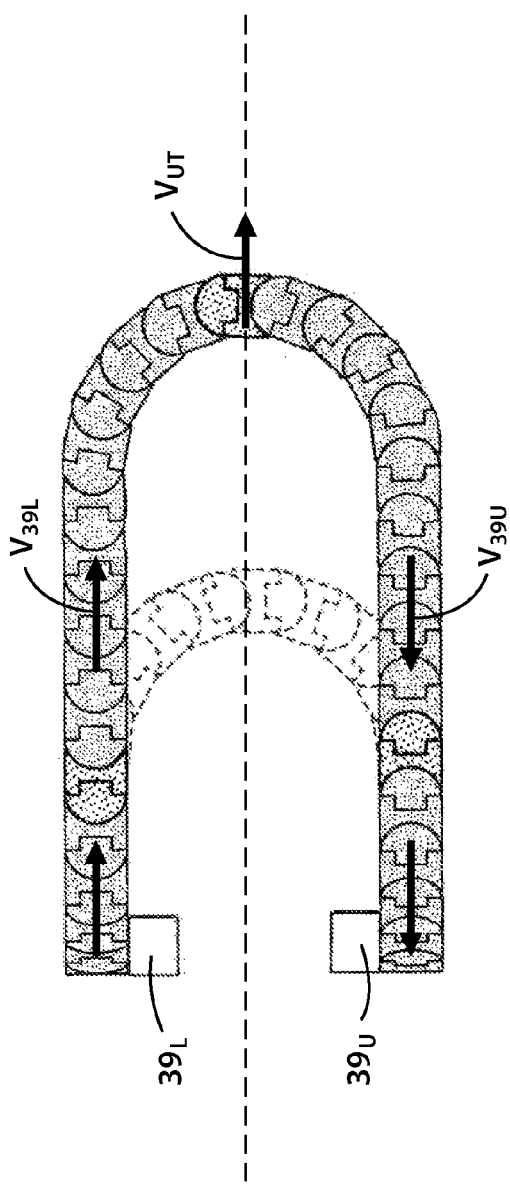
FIG. 24 is a top plan view of the in-feed or out-feed accumulator for explaining the relationship between speed V, relative conveyor direction R, and upper U-turn position on the endless conveyor 21.

Effect of Differences in Speed V, Relative Conveyor Direction R, and Upper U-Turn Position on Endless Conveyor 21 (refer to FIG. 24).

| Scenario | Drive Motor 39L In-feed Accumulator Entrance Out-feed Accumulator Exit | | Drive Motor 39U In-feed Accumulator Exit Out-feed Accumulator Entrance | | U-Turn Extend/Retract | U-Turn Extend or Retract Speed V(UT) |
|---|---|---|---|---|---|---|
| 1 | V | R | V | R | Stationary | Stationary |
| 2 | V + ΔV | R | V | R | Extend | ΔV/2 |
| 3 | V | R | V + ΔV | R | Retract | ΔV/2 |
| 4 | V | −R | V | R | Retract | V |
| 5 | V | R | V | −R | Extend | V |
| 6 | V + ΔV | R | V | −R | Extend | V + ΔV/2 |
| 7 | V | R | V + ΔV | −R | Extend | V + ΔV/2 |

The capability of endless conveyor 21 to traverse in a continuous (non-discrete) manner between a first and second position without rotation is one of the unique and inventive features of the feed side accumulators 20 and of the entire accumulator 10. To prevent the endless conveyor 21 from being "spit out" by the upper wheel $27_U$ as the endless conveyor 21 traverses without rotation of that wheel, one end of the cable 41 is connected to a spring 43, which is affixed to the lower plate $29_L$. Spring 43 allows cable 41 to take up any slack between the wheels 27 as one wheel $27_{UorL}$ pulls and the other wheel $27_{LorU}$ pushes.

When the endless conveyor 21 is moving between the first and second positions without rotation, its already exposed carrier segments 23 preferably do not advance (or retreat). For example, assume that the out-feed endless conveyor 21 is in the position shown in FIG. 8 when the upper wheel $27_U$ starts to traverse back toward the first end 35 (right) of the accumulator housing 33 (see scenario 4 of Table 1 and FIG. 24). At the end of its traverse, the upper wheel $27_U$ ends in the position shown in FIG. 9. Exposed carrier segments $23_{A\&D}$ remain in their same position throughout the traverse. The unexposed segments $23_{B\&C}$ at the start of the traverse become exposed at some point during the traverse.

Note that, in addition to "backing up" the endless conveyor 21 toward the first end 35 without wheel rotation, the endless conveyor 21 may also be reversed with counter rotation of the conveyor at the U-turn wheels or guides for timing purposes (see scenarios 5, 6, and 7 of Table 1 and FIG. 24). This allows the intermediate transfer device 70 additional time, if required, for the transfer device 70 to index to a proper position relative to a lane 51 and verify that position before starting the actual transfer of articles between feed accumulator 20 and the lane 51. To avoid compressing incoming articles, the length of the upper portion of the endless conveyor is increased at a rate greater than the speed at which the conveyor is being reversed.

Another unique, inventive feature is the placement of the wheels 27 in different horizontal planes. This placement allows the drive motors 39 to be located at the same end of the feed accumulator 20, thereby giving the feed accumulator 20 a smaller footprint. The wheel placement also allows the wheels 27, and therefore the endless conveyor 21, to have a greater length of travel within this smaller footprint.

Figure 20:
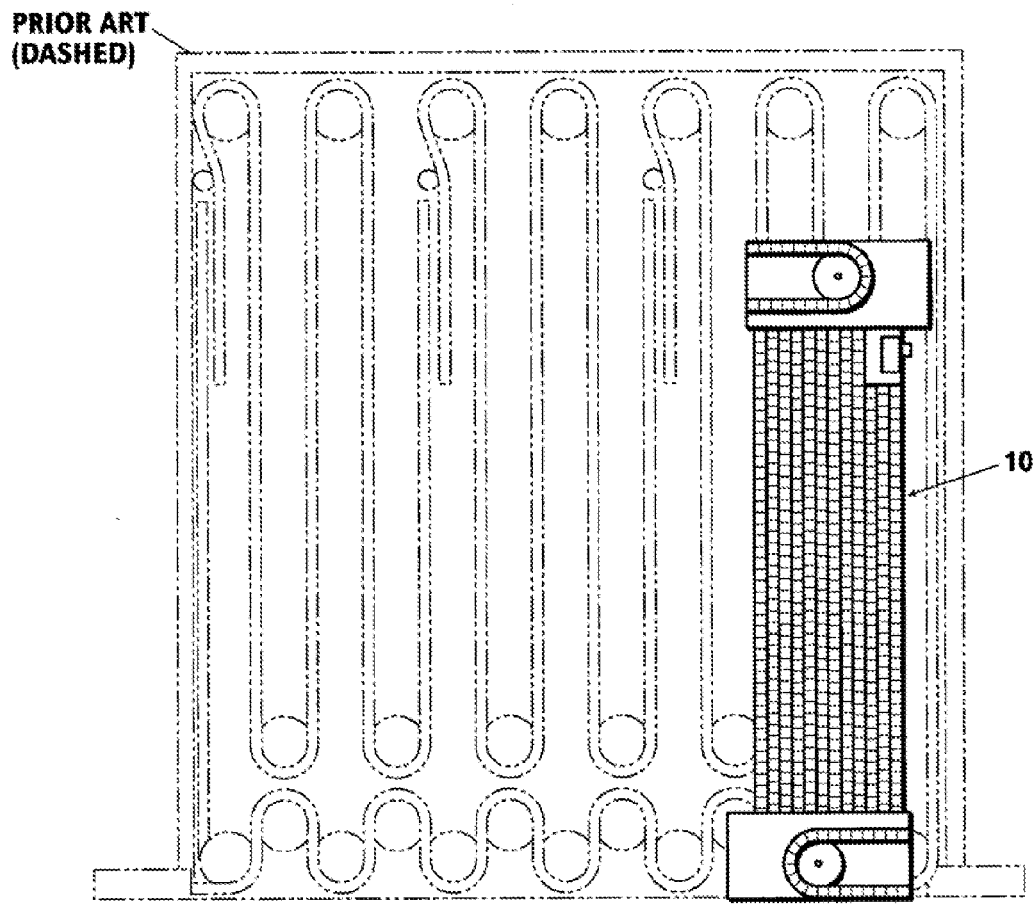
FIG. 20 is the accumulator of FIG. 5 superimposed over of the prior art accumulator of FIG. 1. Both accumulators have been sized to have the same capacity. The accumulator of FIG. 5 requires a much smaller footprint to provide the same capacity as that of the prior art accumulator.
Figure 4:
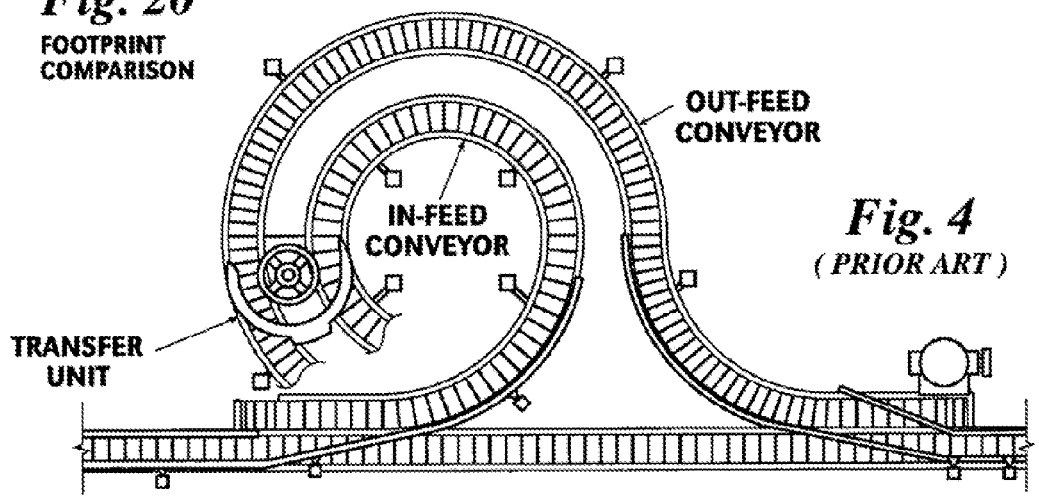
FIG. 4 is a top plan view of the prior art accumulator disclosed in U.S. Pat. No. 6,725,998. The accumulator stores items in a vertical spiral and uses a transport member to move along a path parallel to an in-feed conveyor and an out-feed conveyor. The transport member deflects articles from the in-feed conveyor to the out-feed conveyor. Depending on the relative speeds of the two conveyors, the transport member moves to increase or decrease the quantity of items which can be stored on the conveyors. However, the in-feed storage capacity cannot be adjusted without also adjusting the out-feed storage capacity.
Figure 21:
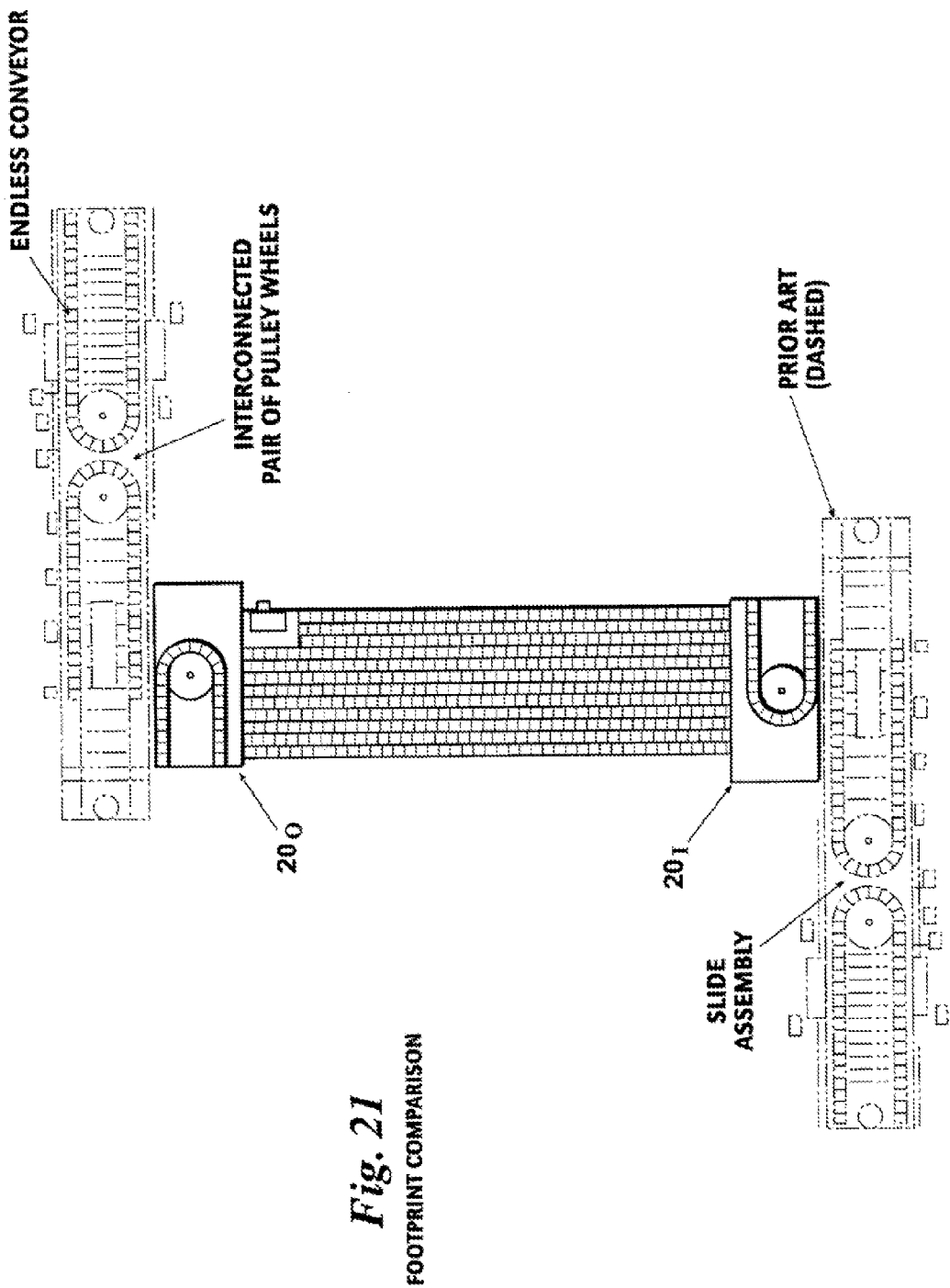
FIG. 21 is the in-feed and out-feed accumulator of FIG. 5 drawn adjacent to the paired interconnected pulley wheels of the prior art accumulator of FIG. 1. Because the paired pulley wheels are located in the same horizontal plane, the footprint of this prior art accumulator is much larger than that of the in-feed and out-feed accumulator of FIG. 5 in order to provide the same carrying capacity.

The feed accumulator 20 provides a greater carrying capacity within its footprint than prior art accumulators which place the wheels in the same horizontal plane (see FIGS. 20 & 21). Placing the wheels in the same horizontal plane results in a footprint approximately 30 to 40 percent longer than that of feed accumulator 20, which has its wheels 27 placed in different horizontal planes. The indirect drive placed at each end of the prior art accumulator also extends its length by about 10 to 20 percent compared to that the accumulator 20 of the invention, which has its drive motors placed at the same end. The prior art accumulator also cannot reverse its travel without losing its conveyor because the slide assembly which carries the interconnected pulley wheels is a fixed body with no means, such as spring loading, to compensate for slack in the conveyor when reversing the travel.

Referring now to FIGS. 5 and 8 to 15, each feed accumulator 20 cooperates with a respective intermediate transfer device 70 that is detachably secured to a transfer member 71. The transfer member 71 traverses left-to-right and right-to-left by means of an endless belt 73 controlled by a stepper or servo motor (see S3 and S4 in FIGS. 25 and 26). The stepper or servo motor S3, S4 controls the speed and direction of rotation of the endless belt 73 and, therefore, the speed and direction of travel of transfer device 70.

The intermediate transfer device 70 preferably has the ability to pivot or lift its nose end 75 when indexing from one lane 51 to another lane 51, thereby avoiding any interference with the lanes 51 during indexing. Each lane 51 is an endless conveyor 53 typically made up of linked carrier segments 55 (i.e., a slat chain conveyor). Any given carrier segment 55 in one lane 51 may not lie exactly in the same horizontal plane as a carrier segment 55 laying adjacent to it in the next lane 51

(carrier segments $55_N$ and $55_{N\pm1}$, respectively). Further, one carrier segment 55 may lie partly ahead or behind another adjacent segment in the next lane 51. Also, as a carrier segment 55 begins to expose its carrying surface on the in-feed end of mass accumulator 50 (or hide that surface on the out-feed end), a leading portion of the carrier segment might lie slightly above that of an adjacent carrier segment. If any of these interference situations occurs at the same time that the transfer device 70 needs to reposition or index to the next lane $55_{N\pm1}$ (or to any lane $55_{N\pm A}$), the device 70 might hit the carrier segment 55 and cause damage to the lane $51_N$ or $51_{N\pm1}$, the transfer device 70, or articles being transferred.

Referring specifically to FIGS. 11 to 15, to pivot or lift the nose end 75, the intermediate transfer device 70 has lifting means 77 located toward the nose end 75. In a preferred embodiment, the lifting means 79 includes rollers 81 positioned below the transfer member 71 and configured to ride over the undulating upper surface 101 of a cam plate 100. Each roller 81 has a bracket 83 connected to its axle that receives a fastener 85. The fastener 85 passes through the transfer member 71 until its upper end 87 comes into contact with the lower surface 77 of the nose end 75.

The cam plate 100 is arranged relative to the mass storage accumulator 50 so that each low cam position 103 is directly opposite the median line of each lane and each high cam position 105 is between lanes, that is, the gap 57 formed by the opposing longitudinal edges of adjacent lanes 51. When the rollers 81 are in the low cam position 103, the nose end 75 of the transfer device 70 is in a normal horizontal orientation. As the transfer device 70 indexes from lane $51_N$ to lane $55_{N\pm1}$, the rollers 81 ride up and onto the high cam position 105, lifting the nose end 75 and allowing it to clear the carrier segments $51_N$ and $51_{N\pm1}$. In a preferred embodiment of the cam plate 100, the high cam position 105 lifted the nose end 75 of the transfer device 70 a maximum of about 2 mm.

The intermediate transfer device 70 provides an indirect transfer between the feed accumulator 20 and the mass storage accumulator 50 by way of two opposing, spaced-apart curved surfaces 89, 95. The curved surfaces 89, 95, which need not be similar in structure, form a lane 91. The curved surfaces 89, 95 may be arranged relative to one another so that an incoming article to lane 91 enters the lane 91 oblique to the article flow on endless conveyor 21 rather than enter orthogonal to it. This oblique entry angle is accomplished in one preferred embodiment by the curved surfaces 89, 95 forming about a 45-degree lead-in or entry portion 93 of the lane 91 of the transfer device 70. The articles are received by the entry portion 93 and then guided by the curved surfaces 89, 95 to accomplish the 90-degree transfer.

The first curved surface 89 may be a curved rail or a curved wall having a plurality of beads or rollers (not shown). The second curved surface 95 may be an endless belt 97 guided by a chain-and-sprocket arrangement and controlled by a stepper or servo motor S1 or S2. Preferably, the belt 97 includes a plurality of flexible fins 99 that come into contract with articles flowing into the lane 91 of the transfer device 70 and help guide those articles along the lane.

When used in combination with the cam plate 100, the stepper or servo motor S1 or S2 used to control the endless belt 95 is preferably located toward the nose end 75 of the transfer device 70 to make the transfer device 70 nose-heavy. Being nose-heavy helps the nose end 75 remain in communication with the fasteners 85 and helps the rollers 81 remain in communication with the cam plate 100 as the transfer device 70 traverses left-to-right and right-to-left.

The lane 91 formed by the curved surfaces 89, 95 provides a lane width appropriate for the article being processed by the upstream processing station and received by the downstream receiving station. If the upstream processing station changes over to a different article that requires a different lane width, the intermediate transfer device 70 may be removed from the slide 71 and replaced by a different, appropriately sized transfer device 70. For example, the different article may be one that is wider than a single lane 51 of the mass storage accumulator 50 and, therefore, requires that two adjacent lanes 51 be moved in concert with one another. A nonadjustable transfer device 70 configured to receive an article equal to or less than the width of a single lane 51 could not accommodate this different article and would need to be changed out for a transfer device 70 that could accommodate it. Alternatively, the width of the lane 51 of the transfer device 70 could be adjustable.

Figure 23:
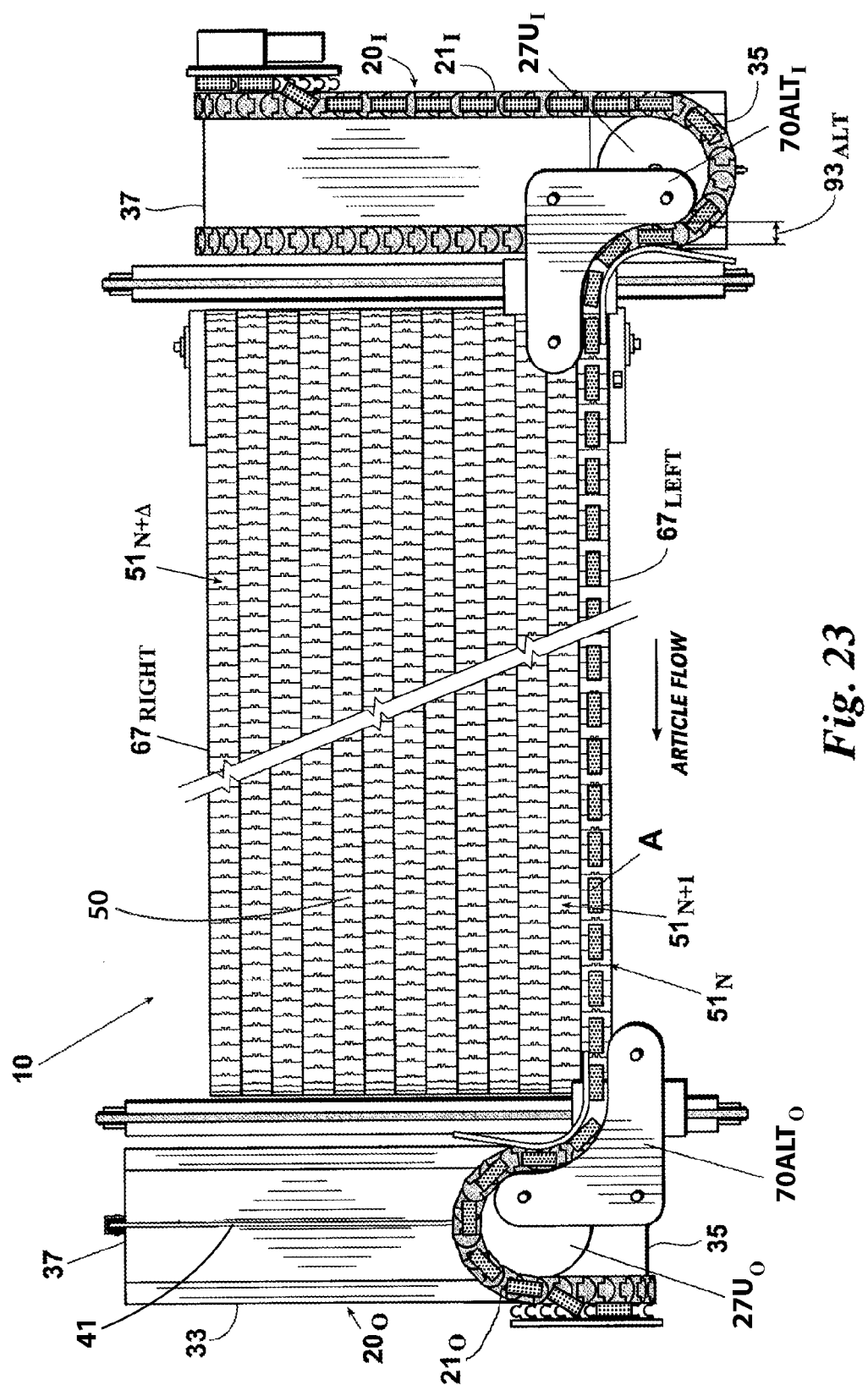
FIG. 23 is a top plan view of the horizontal accumulator of FIG. 5 with an alternate intermediate transfer device. Unlike the oblique lead-in, flexible-fin transfer device of FIG. 5 (and FIG. 10), the transfer device of FIG. 23 is a true 90-degree transfer device with its inlet portion running substantially coaxial with the endless conveyor passing underneath the inlet portion.

Referring now to FIG. 23, the intermediate transfer device 70 may be a true 90-degree transfer device $70_{ALT}$. Unlike the transfer device 70 of FIGS. 5 and 8 to 10 with its oblique lead-in or entry portion 93, the transfer device $70_{ALT}$ shown in FIG. 23 has its entry portion $93_{ALT}$ arranged coaxial to the endless conveyor 21 that passes underneath it. Like the other transfer device 70, the transfer device $70_{ALT}$ shown in FIG. 23 remains independent of the endless conveyor 21.

The intermediate transfer device 70 being independent of the endless conveyor 21 is yet another unique and inventive feature of accumulator 10. Independence allows the transfer device 70 to transfer articles in the direction of article flow and articles are not compressed as the transfer device 70 indexes from lane $51_N$ to lane $51_{N+1}$. "Not compressed" means that the article flow density does not increase. In other words, the spacing between adjacent articles on the endless conveyor 21 does not decrease as the transfer device indexes, no article slides away from its current position along the endless conveyor 21, and no article comes into contact with any adjacent article because of the indexing. This holds true regardless of whether the transfer device 70 is indexing to lane $51_{N+1}$ or lane $51_{N-1}$.

If the transfer device 70 transferred articles in a direction opposite that of article flow (that is, indexing from lane $51_N$ to lane $51_{N-1}$), no articles would compress because the U-turn $27_U$ can move in the same direction and away from the transfer device 70, thereby carrying articles away from the transfer device 70 as it indexes and as the exposed portion of the endless conveyor is extended. This is in contrast to the prior art accumulator shown in FIGS. 2 and 3. The prior art accumulator must index its transfer unit against article flow in order to have a short indexing distance and therefore minimize the amount of compression. The prior art transfer device then moves with article flow on its long index between the last and first lane so that little or no compression occurs. However, the long index time creates variability in article flow.

Additionally, because the intermediate transfer device 70 can index before (or after) the endless conveyor 21 repositions, the transfer device 70 can move at half the rate it would have to move if it were physically connected to the wheel $27_U$. Further, the transfer device 70 can index without an article moving into it. Last, the endless conveyor 21 can momentarily traverse in a direction opposite that of the transfer device 70 as it indexes to lane $51_{N+1}$ or as the transfer device 70 indexes between the last lane 51 and the first lane 51.

The intermediate transfer device 70 may be mechanically connected to the plate $29_U$ of the feed side accumulator 20 but this is not preferred for use in high speed operations. When mechanically connected in this way, the transfer device 70 moves in unison with the plate $29_U$.

Referring now to FIGS. 5 and 15 to 19, each lane 51 of the mass storage accumulator 50 is in communication with a sprocket $61_{U\&L}$ that engages the carrier segments 55 and its respective electro-magnetic clutches $59_{U\&L}$ ("Electro-magnetic clutch" is referred to as "clutch" in the following and alternatively could be substituted by motors or other clutches). The clutches $59_{UorL}$ of two or more lanes 51 may be configured in a modular arrangement, with a set of clutches $59_{UorL}$ mounted on the same shaft or axle $61_{UorL}$ with the axles 61 then connected to accommodate a wider configuration of the mass storage accumulator 50.

The shaft or axle $61_U$ of the upper clutches $59_U$ are in communication with an upper drive motor $63_U$. The axle $61_L$ of the lower clutches $59_L$ is in communication with a lower drive motor $63_L$. The drive motors 63 are preferably located within the footprint of the plurality of lanes 51 and a respective shaft or axle 69. Each axle $69_{UorL}$ shares a chain drive with its corresponding axle $61_{UorL}$, respectively. The drive motors $63_{U\&L}$ may have different power ratings.

When the accumulator 10 is operating, both drive motors 63 may be running at their respective, predetermined constant speed and driving their respective axle 61. By engaging one of the clutches $59_{UorL}$ of a lane 51, the lane 51 moves from an idle state to a traveling or conveying state. The motors 63 may be modulated based on in-feed and out-feed conditions, thereby changing the speed at which any given lane 51 travels. Encoders E2, E3 may be used to record the number of rotations of the motors 63 for purposes of tracking product movement. A pair of opposing photo-electric eyes 113 may also be used to monitor the status of article flow on lanes 51.

Having the clutches $59_{UorL}$ on the same axle 61 in communication with the same drive motor $63_{UorL}$ allows two or more lanes 51 to be simultaneously, instantaneously and independently stopped or driven by the drive motor. This arrangement of the clutches 59 also allows for some number of the clutches $59_{UorL}$ to be electronically bypassed without impact the operation of the drive motors $63_{U\&L}$ and the remaining clutches $59_{U\&L}$. The mass storage accumulator 50, and therefore the accumulator 10, can therefore run continuously.

Each clutch $59_{UorL}$ is independent of the other clutch $59_{LorU}$ to which it is connected in series. Each clutch 59 is also independent of any other clutch $59_{UorL}$ in any other lane 51. The upper clutches $59_U$ and the upper drive motor $63_U$ may be under the control of the in-feed logic while the lower clutches $59_L$ and lower drive motor $63_L$ are under the control of the out-feed logic (or vice versa). Each clutch 59, when engaged, allows for control of the speed, acceleration and deceleration of its respective lane 51.

One of the unique and inventive features of the mass storage accumulator 50 is that the clutches $59_{U\&L}$ are connected in series on the same lane 51. Another unique and inventive feature is that the clutches $59_{UorL}$ are arranged side-by-side on the same axle 61. This arrangement allows at least two different lanes 51 to be in the traveling or conveying state at the same time. This also allows at least two different lanes 51 to simultaneously and instantaneously move into a conveying state. Still further, this allows one lane 51 to run at a different speed than another lane 51 or to accelerate or decelerate at a different rate. Additionally, this configuration allows for instantaneous stopping of one lane 51 while at the exact same time starting another lane 51. As a result, the mass storage accumulator has a much faster cycle time than that of prior art accumulators in moving between lanes and the ability to close or reduce any gap that might occur in the article flow. Throughout this disclosure, the term "gap" refers to spacing between adjacent articles different than the spacing created by the processing rate of the upstream delivery station. For example, the spacing of articles on a drink box packaging line might be about one-half inch when the upstream delivery station is processing drink boxes. This constant spacing is interrupted whenever the upstream delivery station momentarily goes down, thereby creating gaps in the product flow.

Figure 2:
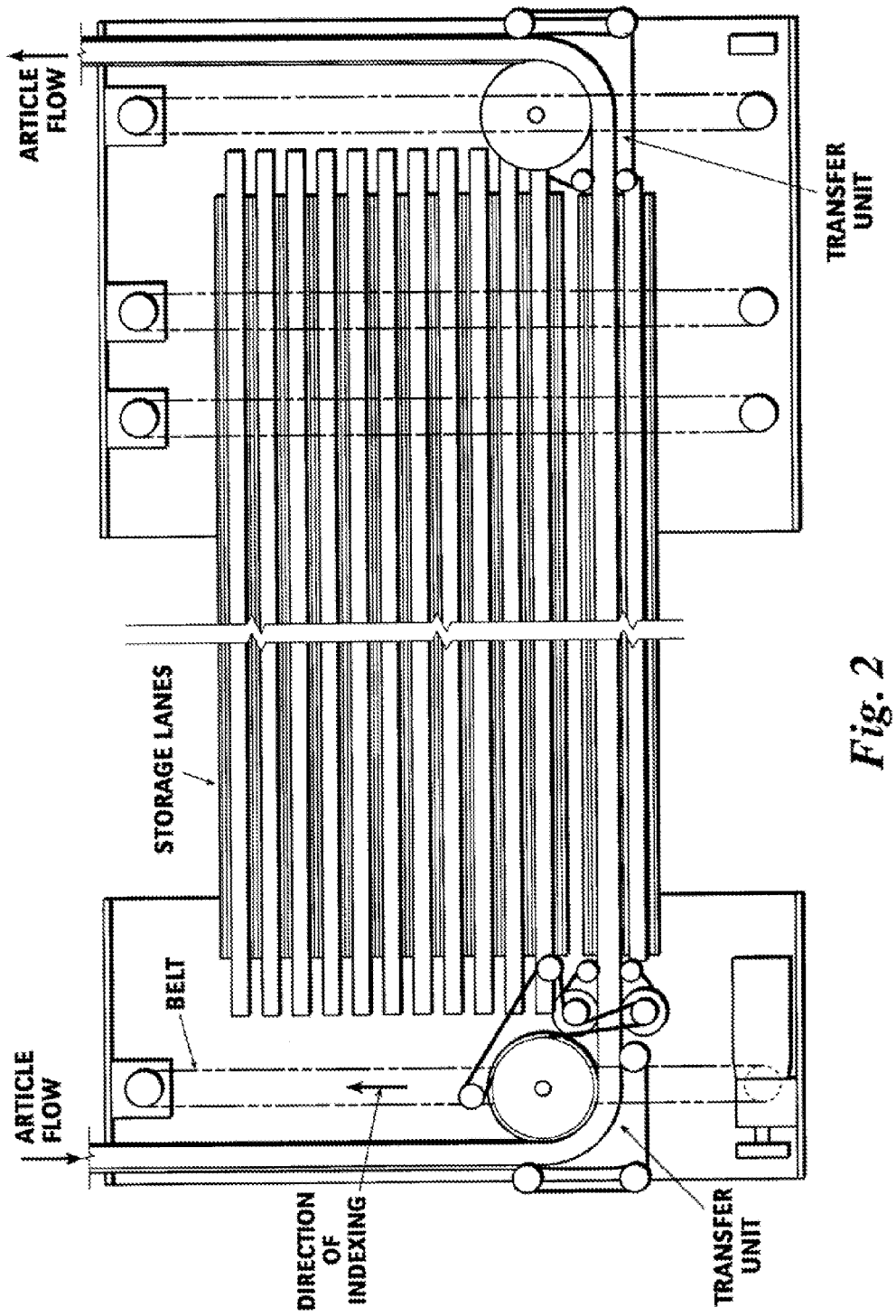
FIG. 2 is a top plan view of another prior art accumulator, that of DE Pat. No. 103 12 695. Because the transfer device of that accumulator loads against article flow, it compresses the items when indexing to load a new lane. If the transfer device were to index load with article flow, it would nonetheless compress the items during its return travel. Further, the accumulator creates gaps in article flow on the out-feed side because of (1) the return travel time required to reset the transfer device to the next or new lane; (2) the use of a discrete drive mechanism (see FIG. 3) which, like return travel, increases cycle time; and (3) the accumulator lacking means to compensate for increased cycle time. Additionally, it is difficult to offer different in-feed and out-feed locations.
Figure 3:
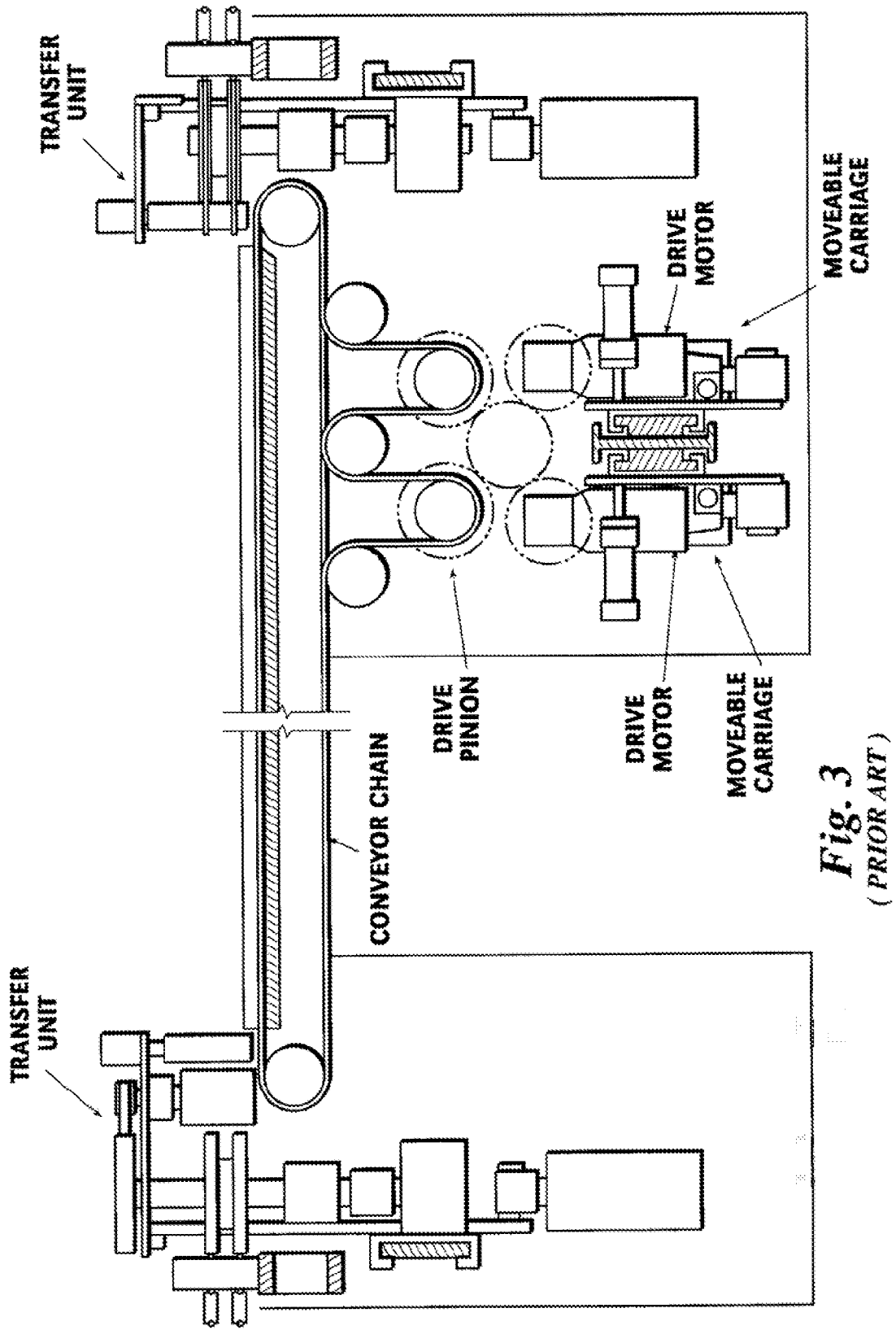
FIG. 3 is a side elevational view of the accumulator of FIG. 2. A drive pinion and pivotal drive motor arrangement controls the movement of each storage line or lane. When engaged, the drive pinion moves the lane from an idle state to a travel or convey state. Although one lane can theoretically move from travel to idle as another lane moves from idle to travel, because of the discrete nature of the drive mechanism the movement is not simultaneous. Further, the acceleration and deceleration of the two lanes are not independent of one another. Because one drive must completely disengage before it can shift to the next lane and re-engage, a time lag exists between one lane starting and the other lane stopping. In other words, two or more lanes cannot change their respective states simultaneously.

In comparing the capability of the accumulator 10 and mass storage accumulator 50 to that of the prior art accumulator shown in FIGS. 2 and 3, the prior art accumulator can shift from one lane to the next but, because of its means to do so, a time lag exists between one lane starting and the other lane stopping. To move a lane into a conveying state when another lane is in the conveying state, the currently conveying lane must completely disengage before the drive and pinion gear mechanism can shift to the next lane and re-engage. Therefore, only one lane can be in the conveying state at any given time. Further, the acceleration and deceleration of the two lanes are not independent of one another. Because of its structure, this prior art accumulator has a slower cycle time than that of accumulator 10 and mass storage accumulator 50 of the invention, and only can close or reduce any gap that may be present in the article flow by pausing the loading of the lane. Additionally, that prior art accumulator cannot return those articles to the customer conveyor without creating a gap in article flow.

The manner by which the accumulator 10 and mass storage accumulator 50 compensates and corrects for variability in article flow is a unique and inventive feature. Simply stated, the structure of the accumulator 10 allows the accumulator 10 to take advantage of increased programming flexibility and control. The same control software applied to prior art accumulators, such as those illustrated in FIGS. 1 to 4, would be limited in what it could accomplish because of the mechanical limitations inherent in the design of those prior art accumulators.

By way of example, when loading a lane $51_N$ of the mass storage device 50, the lane's respective upper clutch $59_U$ is engaged and and the in-feed motor $63_U$ comes under the control of in-feed logic. The out-feed motor $63_L$ may also be running but the lower clutch $59_L$ associated with the lane $51_N$ is disengaged. If the upstream delivery station is momentarily down (about 2 or 3 seconds) and then up, incoming articles begin arriving in a "lumpy," rather than constant flow pattern because there is now a gap in the article flow. The in-feed motor $63_U$ modulates according to the incoming article flow as does the in-feed accumulator $20_I$ which may slow or stop. At the same time a different emptying lane $51_N$ may be discharging articles, with its respective clutch $59_L$ engaged and the out-feed motor $63_L$ coming under the control of out-feed logic. The emptying lane $51_N$ may be running at a faster speed than filling lane $51_N$ and might have to slow or stop.

Now, assume that the downstream receiving station is momentarily down (about 2 or 3 seconds). The endless conveyor $21_O$ can extend all the way to the second end 37 of the accumulator housing 33 while the transfer device $70_O$ continues to transfer articles to the conveyor $21_O$ without moving away from the current emptying lane $51_N$. When the downstream delivery station is back up and running, the out-feed conveyor $21_O$ remains in its current position and, when the current emptying lane $51_N$ is empty, the lane $51_N$ is stopped and the transfer device $70_O$ indexes at the same time to a another lane $51_{N+1}$.

If the same scenario were to occur with the prior art accumulator of FIGS. 2 and 3, the transfer unit would have to index immediately when the downstream receiving station goes down. The reason for this is that the prior art accumulator cannot simultaneously and instantaneously stop one lane and start the next lane. There is always a delay between stopping one lane and starting the next. Therefore, the prior art accumulator introduces gaps in the out-feed side any time the downstream receiving station goes down.

Table 2 below provides examples of the various states that two lanes $51_{N\&N\pm\Delta}$ can be in at the same time and the states to which each can independently, simultaneously, and instantaneously change at the same time. One lane $51_N$ is the filling lane and the other lane $51_{N\pm\Delta}$ is the emptying lane. The acceleration or deceleration of each lane 51 is a function of the modulation of the drive motor $63_{UorL}$ to which it is engaged. When a clutch $59_{UorL}$ of a lane 51 is engaged, the lane 51 is in the travelling state and running at rate of speed determined by the in-feed or out-feed logic controlling the respective drive motor 63. Note that Table 2 could be expanded to show four lanes 51 or other even multiples of lanes 51. For example, at the same time one filling lane 51 may be slowing, another filling lane 51 may be starting, one emptying lane 51 may be slowing, and another emptying lane 51 starting.

TABLE 2

Example: engaged (E), engaged accelerating ($E_A$), engaged decelerating ($E_D$) and disengaged (D) states of clutch series $59_{U\&L}$ for each of two lanes $51_{N\&N\pm\Delta}$ at a same time.

|  | $51_N$ $59_U, 59_L$ | $51_{N\pm\Delta}$ $59_U, 59_L$ |
|---|---|---|
| I | D, D | D, D |
| II | E, D | D, D |
|  | $E_A$, D | D, D |
|  | $E_D$, D | D, D |
| III | D, D | E, D |
|  | D, D | $E_A$, D |
|  | D, D | $E_D$, D |
| IV | D, E | D, D |
|  | D, $E_A$ | D, D |
|  | D, $E_D$ | D, D |
| V | D, D | D, E |
|  | D, D | D, $E_A$ |
|  | D, D | D, $E_D$ |
| VI | E, D | E, D |
|  | $E_A$, D | E, D |
|  | $E_D$, D | E, D |
|  | E, D | $E_A$, D |
|  | E, D | $E_D$, D |
|  | $E_A$, D | $E_A$, D |
|  | $E_A$, D | $E_D$, D |
|  | $E_D$, D | $E_A$, D |
|  | $E_D$, D | $E_D$, D |
| VII | E, D | D, E |
|  | $E_A$, D | D, E |
|  | $E_D$, D | D, E |
|  | E, D | D, $E_A$ |
|  | E, D | D, $E_D$ |
|  | $E_A$, D | D, $E_A$ |
|  | $E_A$, D | D, $E_D$ |
|  | $E_D$, D | D, $E_A$ |
|  | $E_D$, D | D, $E_D$ |
| VIII | D, E | E, D |
|  | D, $E_A$ | E, D |
|  | D, $E_D$ | E, D |
|  | D, E | $E_A$, D |
|  | D, E | $E_D$, D |
|  | D, $E_A$ | $E_A$, D |
|  | D, $E_A$ | $E_D$, D |
|  | D, $E_D$ | $E_A$, D |
|  | D, $E_D$ | $E_D$, D |
| IX | D, E | D, E |
|  | D, $E_A$ | D, E |
|  | D, $E_D$ | D, E |
|  | D, E | D, $E_A$ |
|  | D, E | D, $E_D$ |
|  | D, $E_A$ | D, $E_A$ |
|  | D, $E_A$ | D, $E_D$ |
|  | D, $E_D$ | D, $E_A$ |
|  | D, $E_D$ | D, $E_D$ |

Figure 22:
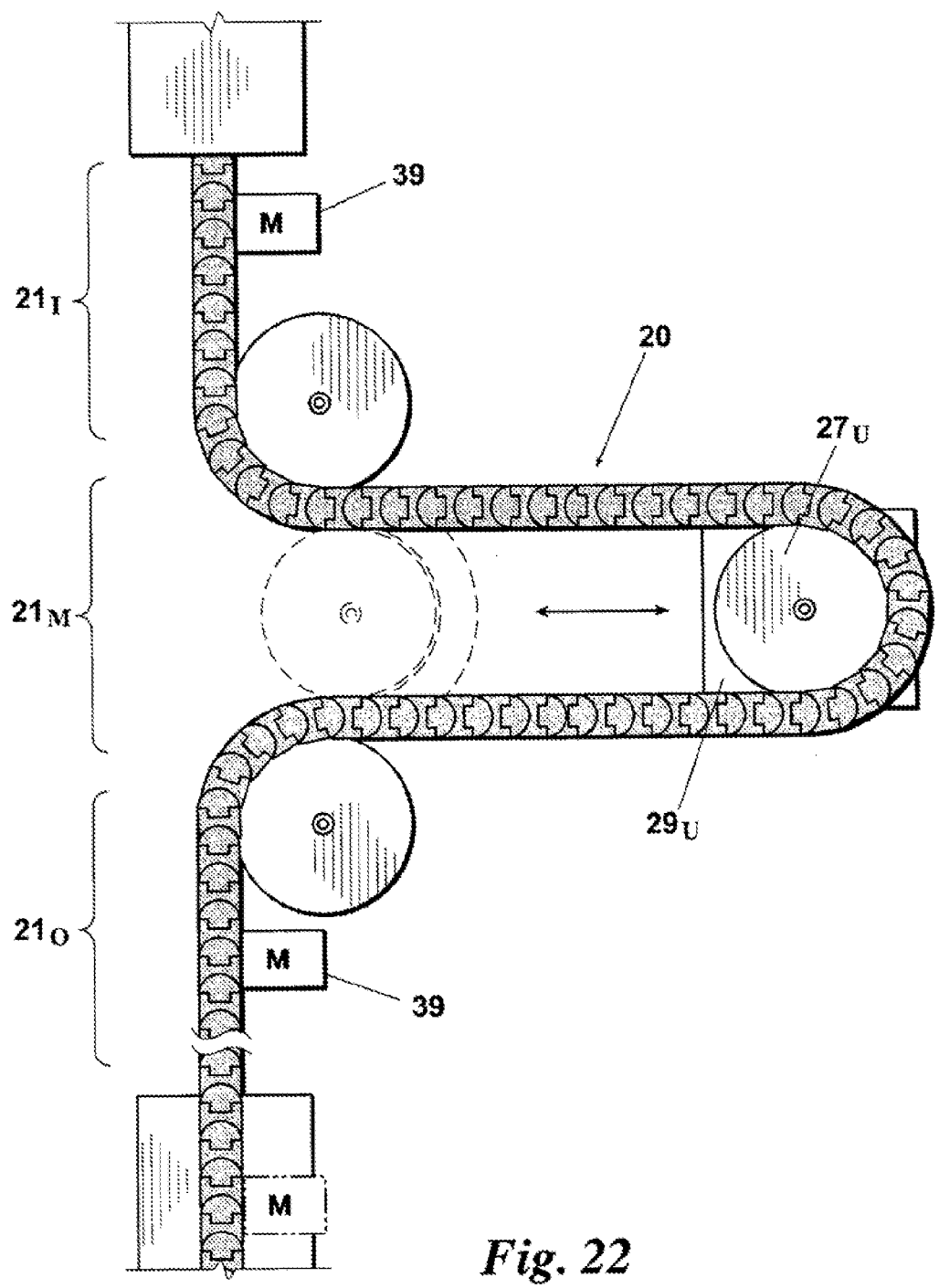
FIG. 22 is an alternate embodiment of the in-feed or out-feed accumulator of FIG. 5, configured for use as a stand-alone accumulator. Unlike the feed accumulators of FIG. 5, the feed accumulator of FIG. 22 includes in-feed and out-feed runs or portions of the endless conveyor. The upper and lower U-turns located in the mid-portion of the accumulator traverse adjacent to the in-feed and out-feed portion of the endless conveyor. The drive motors are mounted opposite one another, on the in-feed and out-feed portions, respectively.

Referring now to FIG. 22, the in-feed or out-feed accumulator 20 of FIG. 5 may be configured for use as a stand-alone accumulator $20_{SA}$. Unlike the oblong shaped of the endless conveyor 21 of the in-feed accumulator 20, the stand-alone accumulator $20_{SA}$ has a straight, in-feed run portion $21_I$ of its endless conveyor 21 and a straight, out-feed run portion $21_O$. The portion of the endless conveyor 21 guided by the U-turn 27 is located in the mid-portion $21_M$ of the endless conveyor 21. The mid-portion $21_M$ traverses relative to the in-feed and out-feed portions $21_{I\&O}$.

Similar to the in-feed accumulator 20 described above, the mid-portion $21_M$ of the endless conveyor 21 of the stand-alone accumulator $20_{SA}$ can traverse between a first and second position with or without rotation in the same manner as that of the in-feed accumulator 20. However, the drive motors 39 are mounted opposite one another on the in-feed and out-feed portions $21_{I\&O}$, respectively. Additionally, a customer-supplied motor or a motor of a downstream delivery station is in communication with the out-feed portion $21_O$ of conveyor 21.

Returning now to FIG. 5, earlier it was noted that the clutches 59 of the mass storage accumulator 50 may be modularized sets of clutches 59 that are assembled together to create a mass storage accumulator 50 having a particular width. The mass storage accumulator 50 may also be a modular design so that it can be scaled up or down according to the demands of a particular application. The in-feed accumulator 20 may also be made available in a standard length to match the size of the mass storage accumulator 50. When shipping the accumulator 10 to a site, both the in-feed and out-feed accumulators 20 may be placed on and secured to mass storage accumulator 50 such that no further assembly will be required. Further, the various modular components of the accumulator 10 may be arranged to reduce the overall shipping footprint.

Having described various structural components and the functionality of various aspects of the preferred embodiment, several scenarios of the operation of the preferred embodiment of the accumulator will be described.

Initial Startup and Steady State Operation

Figure 25:
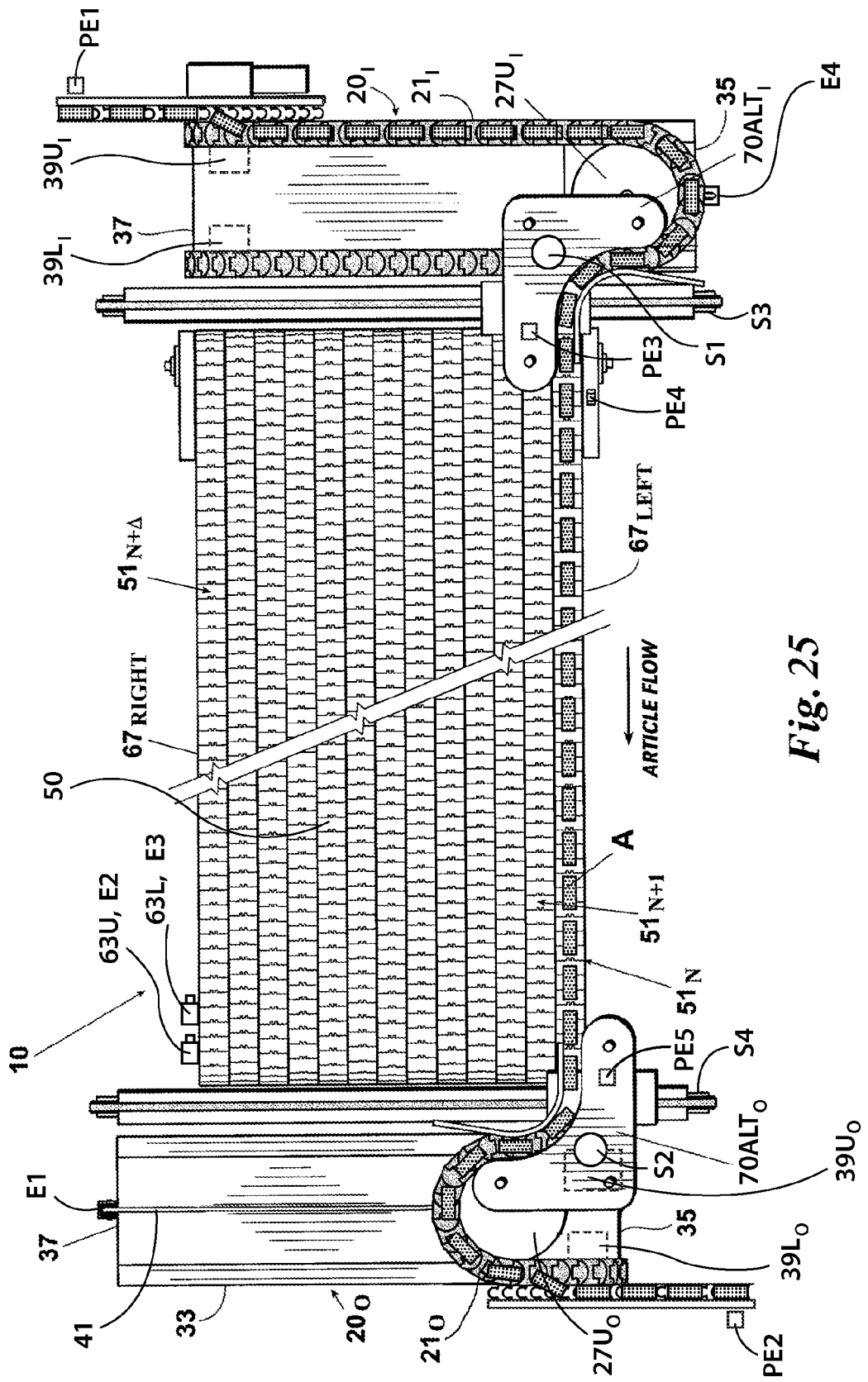
FIG. 25 is a top plan view of the horizontal accumulator showing examples of control and sensing devices for controlling product flow through the accumulator.
Figure 26:
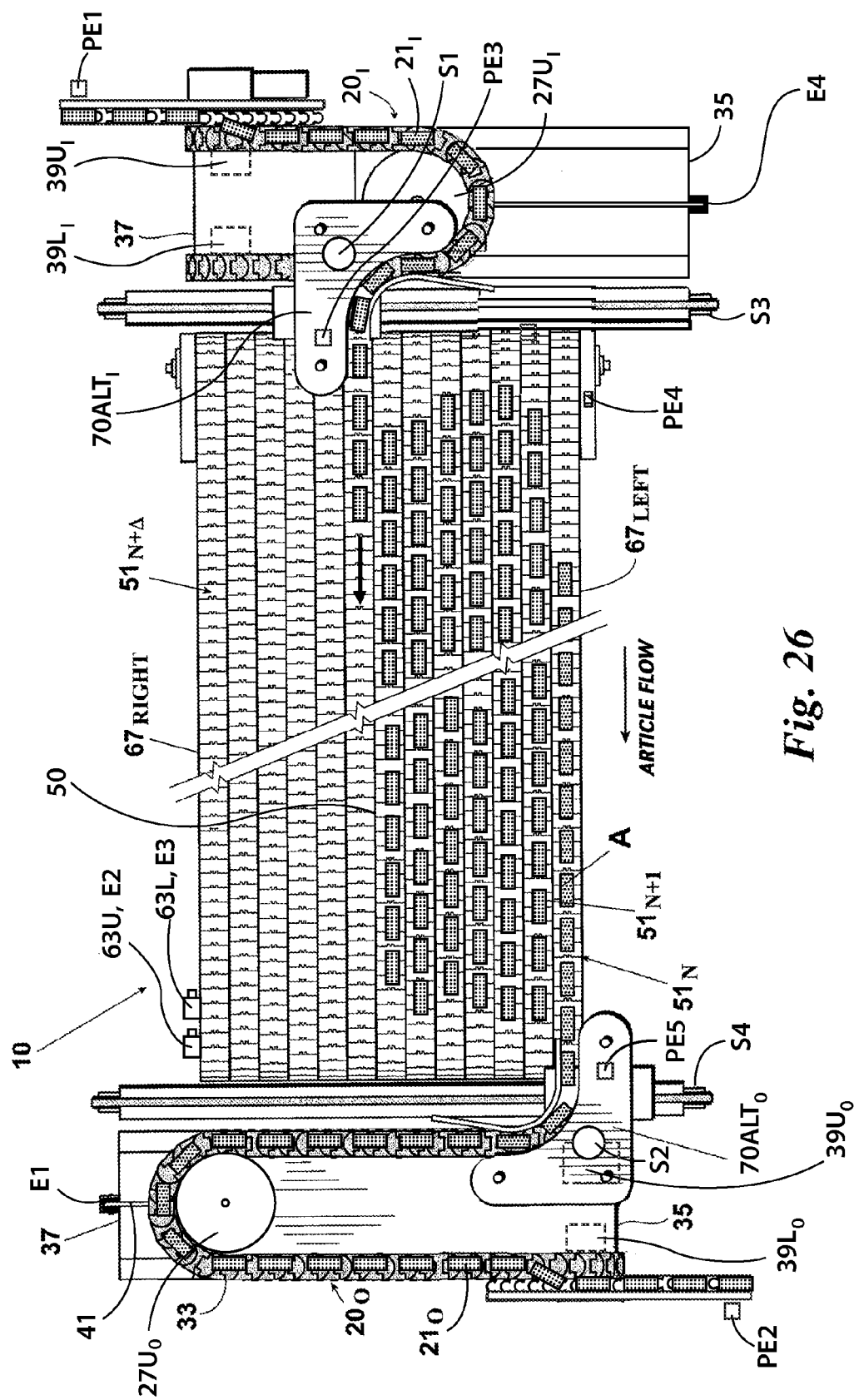
FIG. 26 is a top plan view of the horizontal accumulator showing a partially accumulated state. Articles are shown being received and discharged simultaneously.

Referring to FIGS. 25 and 26, when articles initially arrive at a first photocell PE1, the in-feed accumulator motors $39U_I$, $39L_I$, a first servo motor S1, the mass storage in-feed drive motor 63U, the in-feed clutch (shown as $59_U$ in FIG. 18) for lane $51_N$, the second servo motor S2 and the out-feed accumulator motors $39U_O$ and $39L_O$ are all energized. All of these motors are initially operated at a matched speed, with the in-feed and out-feed accumulator motors $39U_{I\&O}$ and $39L_{I\&O}$ turning in opposite directions and all operating the conveyor in the normal direction of article flow.

As a result, articles will flow steadily from the in-feed accumulator to the out-feed accumulator. During this state, small gaps in article flow measured by the first photocell PE1 can be ignored by the system since there are no articles stored on the accumulator, and therefore there are no articles available to fill in any gaps in the flow of articles. Any durational gap between articles, as measured by the first photocell PE1, that exceeds the time required for an article to travel the entire length of the machine, is an indication that all articles have exited the machine. In response, the system preferably shuts down most components and thereafter waits for an additional incoming article to be detected by the first photocell PE1.

During steady state operation (i.e., when articles are flowing through the machine uninterrupted), the first photocell PE1 can detect articles that have become too closely packed on the customer's in-feed accumulator. Should the first photocell PE1 detect a tightly packed group of articles approaching the machine in-feed accumulator, a short delay timer will allow the leading edge of this group to reach the in-feed endless conveyor $21_I$. All of the motors and servos which are operating at matched speed except the lower out-feed accumulator motor $39L_O$ (which controls the speed at which articles flow out of the out-feed accumulator) will accelerate. As a result, the U-turn $27U_O$ of the out-feed accumulator $20_O$ will slightly extend due to the upper out-feed motor $39U_O$ running slightly faster than the lower out-feed motor $39L_O$. As a result, the horizontal accumulator 10 will have inserted the correct gap between the previously tightly packed articles, maintaining a consistent spacing through the machine.

Once the U-turn $27U_O$ of the out-feed accumulator $20_O$ has left its home position relative to the out-feed transfer device $70ALT_O$, the machine's programmable controller (PLC) will utilize a second photocell PE2 to detect status signals downstream of the out-feed accumulator $20_O$ and will modulate or accelerate as needed to empty this small surge from the out-feed accumulator $20_O$. By increasing the speed of the lower out-feed motor $39L_O$, without an equal increase in the speed of the upper out-feed motor $39U_O$, article output will increase and the U-turn $27U_O$ of the out-feed accumulator $20_O$ will retract. Once the U-turn $27U_O$ has reached its home position relative to transfer device $70ALT_O$, the lower out-feed motor $39L_O$ will cease independent operation and return to the same speed as the other motors and servos.

Steady State with Momentary Downstream Stoppage

As previously mentioned during steady state operation, the speed of the in-feed and out-feed accumulator motors $39R_{I\&O}$, $39L_{I\&O}$, the in-feed drive motor 63U of the mass storage accumulator 50, the first servo motor S1, and the second servo motor S2 are controlled via the PLC and modulate together as one unit. The out-feed drive motor 63L of the mass storage accumulator 50 does not need to run until articles have been loaded thereon and the in-feed transfer device $70ALT_I$ has indexed off of lane $51_N$.

When the PLC receives a stop signal from the customer's downstream machine or when the second photocell PE2 has detected a backup condition, the lower out-feed motor $39L_O$ of the out-feed accumulator $20_O$ will stop or remain stopped. All other motors upstream will continue to run as previously described. As a result, the out-feed accumulator U-turn $27U_O$ will extend (because the lower out-feed motor $39L_O$ of the out-feed accumulator $20_O$ continues to run) and no articles will be discharged from the out-feed accumulator. If the stop condition is cleared before the U-turn $27U_O$ reaches the maximum travel position as determined by a first encoder E1, then the out-feed motor $39L_O$ of the out-feed accumulator $20_O$ will restart and run faster than normal until all of the articles that were absorbed by the out-feed buffer have been emptied and the U-turn $27U_O$ returns to its home position relative to the out-feed transfer device $70ALT_O$. At this point the machine will return to a steady state condition and the out-feed motor $39L_O$ will drop its speed to match the speeds of the other motors.

Full Stop Downstream with in-Feed Indexing from Lane $51_N$ to Lane $51_{N+1}$

When the PLC receives a stop signal from the customer downstream machine or when the second photocell PE2 has detected a backup condition, the lower out-feed motor $39L_O$ of the out-feed accumulator $20_O$ will stop. All other motors and servos will continue to run or operate as previously described. As discussed above, this causes the out-feed U-turn $27U_O$ to extend so as to buffer articles.

As the out-feed U-turn $27U_O$ of the out-feed accumulator $20_O$ nears full extension, as detected by the first encoder E1, an index cycle is initiated. The PLC will look to a third photocell PE3 located on the in-feed transfer unit $70ALT_I$ to detect the leading edge on the next article. When that leading edge is detected by the third photocell PE3, two actions will occur more or less simultaneously. First, a delay timer will begin and allow the article to travel to a predetermined position. This position is such that the article will still be gripped by the transfer device $70ALT_I$, trapping it prior to indexing, but also forward enough that any article or articles preceding it will have move onto the mass storage accumulator 50 unhindered. At the completion of this time, the first servo motor S1 will stop. Additionally, the in-feed clutch for lane $51_{N+1}$ will be energized. More or less simultaneously with the stopping of the first servo motor S1, a third servo motor S3 will index the in-feed transfer device $70ALT_I$ to the next lane $51_{N+1}$. Just prior to the in-feed transfer device $70ALT_I$ arriving at its correct position at that next lane $51_{N+1}$, the first servo motor S1 will accelerate to discharge articles onto the new lane $51_{N+1}$ (which is then in motion).

As product begins to fill the new lane $51_{N+1}$ of the mass storage accumulator 50, the leading edge of the first article released thereon is sensed by a fourth photocell PE4. At this point, a second encoder E2, corresponding to the in-feed motor 63U of the mass storage accumulator 50, is set to zero and starts counting pulses so that the PLC can keep track of the estimated distance that the articles have traveled along the new lane $51_{N+1}$ following their placement thereon.

As discussed above, the in-feed transfer device $70ALT_I$ indexed away from the U-turn $27U_I$ of the in-feed accumulator $20_I$. As such, the in-feed transfer device $70ALT_I$ moved with the flow of the article (i.e., away from the incoming articles). Hence, no article compression occurs on the in-feed accumulator $20_I$ while the first servo motor S1 is stopped and the in-feed transfer device $70ALT_I$ is indexing. Following the indexing of the in-feed transfer device $70ALT_I$, the lower in-feed motor $39L_I$ is accelerated in order to bring the U-turn $27U_I$ of the in-feed accumulator $20_I$ back into its normal position relative to the in-feed transfer device $70ALT_I$. During this procedure, the first servo motor S1 and the in-feed drive motor 63U of the mass storage accumulator 50 are also increased to maintain consistent spacing of the articles on the lane on which they are being placed. Once the in-feed U-turn $27U_I$ has reached its normal position closer to the in-feed transfer device $70ALT_I$, then the lower in-feed motor 39L the first servo motor S1, and the in-feed drive motor 63U of the mass storage accumulator 50 will return to their normal operating speed.

While loading articles onto a lane other than $51_N$, the out-feed drive motor $39L_O$ may have started to feed the downstream equipment. In this situation the out-feed operation of the machine and the in-feed operation of the machine (loading and unloading) have now begun to operate independently.

Unlike during normal steady state conditions, during full stop downstream with in-feed indexing conditions the in-feed operation also changes in that if a gap between articles is sensed by the first photocell PE1, all elements of the in-feed operation will immediately stop until more articles are detected at the first photocell PE1. This ensures that the gap is removed and thereby maximizes the storage capacity of the accumulator 10.

Indexing from Lane $51_{N+1}$ to $51_{N+2}$ to $51_{N+\Delta}$

When the PLC determines from the second encoder E2 that the lane $51_{N+1}$ being filled of the mass storage device is almost-full (which corresponds to being about eight inches from the maximum allowed travel, the PLC will again look to the third photocell PE3 to detect the leading edge of an article that is about to be placed on the mass storage accumulator. Additionally, the in-feed clutch $59U_{N+2}$ for the next lane $51_{N+2}$ will energize. The in-feed clutch $59U_{N+1}$ of the current lane $51_{N+1}$ remains energized until that lane has reached its maximum allowed travel. This ensures that the last article that has been placed onto the lane $51_{N+1}$ has cleared the fourth photocell PE4 and that it is therefore safe to index the in-feed transfer device.

After indexing to the next lane $51_{N+2}$, the accumulator 10 will iterate the steps described above to fill as many lanes 51 of the mass storage device as are needed until conditions downstream of the accumulator 10 change or the accumulator reaches maximum capacity.

In high-speed operations, an additional action involving the in-feed accumulator U-turn $27U_I$ during indexing may be performed. Unlike the indexing described above where the in-feed U-turn $27U_I$ will follow in what could be described as an "inch-worm" motion (i.e., the in-feed transfer device $70ALT_I$ indexes first, and thereafter the in-feed accumulator U-turn $27U_I$ follows, the in-feed U-turn $27U_I$ may follow in what could be described as an "accordion" motion during high speed operations or when articles being conveyed are relatively unstable. The accordion motion allows for additional accumulation on the in-feed accumulator $20_I$ during the indexing cycle. In order to accomplish this, the in-feed U-turn $27U_I$ will extend away from the in-feed transfer device $70ALT_I$ while the in-feed transfer device is moving in the opposite direction indexing from one lane to the next. To accomplish this movement, the lower in-feed motor $39L_I$ will momentarily slow while the third servo motor S3 is moving the in-feed transfer device $70ALT_I$ to the next lane. Then, following the completion of the indexing of in-feed transfer device $70ALT_I$, the lower in-feed motor $39L_I$ will be accelerated to a rate faster than the upper in-feed motor $39U_I$ is running to bring the in-feed U-turn $27U_I$ back to its home position relative to to the in-feed transfer device $70ALT_I$.

Out-Feed Stoppage Corrected, Out-Feed Restarts, in-Feed Still Loading

When the PLC receives a downstream clear signal and the second photocell PE2 is open, then out-feed clutch for the first lane $51_N$ will be energized and out-feed drive motor 63L of the mass storage accumulator 50, the out-feed motors $39U_{O\&L}$ of the out-feed accumulator $20_O$, and the servo motor S2 of the out-feed transfer device $70ALT_O$ will all begin to run with their speeds controlled in unison. Thereafter, articles will begin exiting the first lane $51_N$. These motors will run according to the demand of the customer's downstream machine, and their speeds will modulate simultaneously based on the length of queue at the downstream machine as determined by the second photocell PE2 or some other downstream detector.

It should be appreciated that the out-feed U-turn $27U_O$ remains fully extended (near the last lane $51_{N+\Delta}$). The extra amount of articles on the out-feed conveyor $21_O$ will be reserved for use in eliminating gaps created during indexing cycles of the out-feed transfer device $71ALT_O$.

When a third encoder E3 has detected that the conveyor chain or belt of the first lane $51_N$ has traveled sufficient distance to ensure that all articles have been cleared from first lane, the servo motor S2 of the out-feed transfer device $70ALT_O$ will stop or slow down, the out-feed clutch $59L_{N+1}$ for next incremental lane $51_{N+1}$ will energize almost simultaneously, and a fourth S4 servo motor will index the out-feed transfer device $70ALT_O$ to the next lane $51_{N+1}$. During this time, the lower out-feed motor $39L_O$ will continue to run feeding out articles as needed. Should it be necessary to prevent gaps between articles on the out-feed accumulator $20_O$ resulting from the out-feed transfer device $70ALT_O$ indexing procedure during any of the stoppages during indexing, the upper out-feed motor $39U_O$ can be slowed or stopped momentarily. As a result, the out-feed U-turn $27U_O$ will retract towards the first lane $51_N$ of the mass storage accumulator 50 to ensure that product can continue to be discharged from the accumulator 10. This also prevents any product gap from forming at the exit or inlet of the out-feed transfer device $71ALT_O$.

After the out-feed transfer device $70ALT_O$ has indexed to the next lane, the out-feed lower drive motor 63L of the mass storage accumulator 50, the second servo S2 on the out-feed transfer device $70ALT_O$, and the upper out-feed motor $39U_O$ will be accelerated to a higher speed than the rate at which the lower out-feed motor $39L_O$ is running (i.e., faster than demand). This moves the out-feed U-turn $27U_O$ to its maximum extension (past lane $51_{N+\Delta}$). After the out-feed U-turn $27U_O$ reaches its maximum extension, such motors slow back down to the speed of the upper out-feed motor $39U_O$. Preferably, only when all articles on the accumulator 10 are moving does the out-feed U-turn $27U_O$ return to its home position relative to the out-feed transfer device $70ALT_O$.

In-Feed Transfer has Reached the Final Lane and at Least One Other Lane is Unloaded After the in-feed transfer device $70ALT_I$ has reached the last lane $51_{N+\Delta}$, then in-feed transfer device $70ALT_I$ and the in-feed U-turn $27U_I$ will return to the first lane $51_N$. This is done without interfering with articles flowing into the accumulator 10 and without compacting articles adjacent the in-feed transfer device $70ALT_I$. In other words, the articles on the in-feed accumulator conveyor $21_I$ maintain their spacing from their adjacent articles. To accomplish this, several things occur. The in-feed upper motor $39U_I$ continues at normal speed rate while the in-feed lower motor $39L_I$ reverses rotation so that it rotates in the same direction as the upper in-feed motor $39U_I$, thereby causing the in-feed U-turn $27U_I$ to extend to absorb the articles both on and entering the in-feed accumulator conveyor $21_I$ as the in-feed transfer device $70ALT_I$ moves back against article flow. By controlling the direction and speed of the upper in-feed motor $39U_I$, complete control of the rotational movement of the conveyor $20_I$ around the in-feed U-turn $27U_I$ is achieved, thereby avoiding article compaction. The third servo motor S3 simultaneously indexes the in-feed transfer device $70ALT_I$ all the way from the last lane $51_{N+\Delta}$ of the mass storage device 50 to the first lane $51_N$. Preferably the speed of this movement matches the reversal speed of the lower in-feed motor $39L_I$. After the in-feed transfer device $70ALT_I$ reaches the first lane $51_N$, the lower in-feed motor $39L_I$ reverses rotation again, thereby causing articles to move toward the in-feed transfer device $70ALT_I$, which begins discharging articles onto the first lane $51_N$ in the manner described above.

Out-Feed Catches Up to in-Feed

Since the discharge rate is greater than the intake rate, at some time after the discharge of stored articles from the mass storage accumulator 50 has commenced, the out-feeding lane will "catch-up" with the in-feeding lane. This is referred to as a "same lane condition."

Assuming this "catch-up" occurs on a lane other than the first lane $51_N$, the machine is considered empty but out of position. The lane transporting the articles initially is being driven by the in-feed drive motor 63U of the mass storage accumulator 50 via the lane's in-feed clutch. More or less simultaneously, the control for this lane will be switched to the out-feed drive motor 63L of the mass storage accumulator 50 and via the lanes out-feed clutch, and the in-feed transfer device $70ALT_I$ and the in-feed U-turn 27U will traverse back to the first lane $51_N$ in the manner described above. Also more of less simultaneously, the first lane $51_N$ engages the in-feed drive motor $63U$ in preparation of receiving articles.

When the in-feed transfer device $70ALT_I$ is positioned at the first lane $51_N$, it will begin to release articles onto that lane. The out-feed transfer device $70ALT_O$ continues to unload articles from the other lane $51_{N+Y}$ and will traverse back to the first lane $51_N$ after emptying that other lane. While the second servo motor S2 is stopped during the indexing of the out-feed transfer device $70ALT_O$, the out-feed upper motor $39U_O$ reverses direction to retract the out-feed U-turn $27U_O$ to avoid creating article gaps on the out-feed conveyor $21_O$ adjacent the out-feed transfer device. Upon completing the indexing, the second servo S2 and the upper out-feed motor $39U_O$ of the out feed accumulator $20_O$ resume their normal rotation and the machine is then back in steady state mode.

While accumulator 10 and a method for its use have been described in detail, persons of ordinary skill in the art can make changes to its structure or method of use without departing from the spirit and scope of this disclosure. Therefore, a horizontal accumulator made and used according to this invention is only limited by the scope of the claims.

What is claimed is:

1. A mass storage accumulator for controlling a flow of articles from an upstream source to a downstream receiving station, the mass storage accumulator comprising a plurality of parallel conveyor lanes that are each configured and adapted to receive and transport articles, each conveyor lane being formed by a separate endless conveyor, each endless conveyor being operatively and selectively connectable to a first drive motor via a first clutch and to a second drive motor via a second clutch in a manner such that any number of the endless conveyors can be driven by the first motor while any number of the other endless conveyors are being driven by the second motor.

2. A mass storage accumulator in accordance with claim 1 wherein the first clutches are above the second clutches and the clutches are electromagnetically controlled.

3. A method of operating the mass storage accumulator of claim 1 comprising driving a first one of the plurality of endless conveyors at a first speed via the first motor while driving a second one of the plurality of endless conveyors at a second speed via the second motor.

4. An accumulator comprising:
a first and second drive motor; and
a plurality of lanes;
each lane in the plurality of lanes having its own first and second clutch, each first and second clutch being selectively and alternatively able to communicate with the first and second drive motor, respectively;
at least two lanes in the plurality of lines each moving simultaneously and instantaneously between an idling state and a traveling state as one of its own first and second clutch moves between a disengaged state and an engaged state.

* * * * *